(12) United States Patent
Mahata et al.

(10) Patent No.: US 11,463,481 B2
(45) Date of Patent: Oct. 4, 2022

(54) SYSTEM AND METHOD FOR CERTIFICATE-LESS SECURITY MANAGEMENT OF INTERCONNECTED HYBRID RESOURCES

(71) Applicant: Wipro Limited, Bangalore (IN)

(72) Inventors: Debashis Mahata, Salt Lake (IN); Mukesh Manjunath Prabhu, Bangalore (IN); Ranjeet Khanna, Ontario (CA)

(73) Assignee: Wipro Limited, Bangalore (IN)

( * ) Notice: Subject to any disclaimer, the term of this patent is extended or adjusted under 35 U.S.C. 154(b) by 16 days.

(21) Appl. No.: 17/174,369

(22) Filed: Feb. 12, 2021

(65) Prior Publication Data
US 2022/0210198 A1 Jun. 30, 2022

(30) Foreign Application Priority Data
Dec. 30, 2020 (IN) .............................. 202041057085

(51) Int. Cl.
*H04L 9/40* (2022.01)
*G06F 21/45* (2013.01)
*H04L 29/06* (2006.01)

(52) U.S. Cl.
CPC .............. *H04L 63/20* (2013.01); *G06F 21/45* (2013.01); *H04L 63/04* (2013.01);
(Continued)

(58) Field of Classification Search
CPC ..... H04L 63/20; H04L 63/0838; H04L 63/08; H04L 63/083; H04L 63/0846;
(Continued)

(56) References Cited

U.S. PATENT DOCUMENTS

| | | |
|---|---|---|
| 10,404,474 B1 | 9/2019 | Caceres et al. |
| 10,673,840 B2 | 6/2020 | Shukla et al. |
| 2015/0169860 A1* | 6/2015 | Kim ........................ G06F 21/81 726/9 |

OTHER PUBLICATIONS

Chatterjee, U. et al., "Building PUF Based Authentication and Key Exchange Protocol for IoT Without Explicit CRPs in Verifier Database," in IEEE Transactions on Dependable and Secure Computing, vol. 16, No. 3, pp. 424-437, May 1-Jun. 2019, doi: 10.1109/TDSC.2018.2832201. (14 pages).

(Continued)

*Primary Examiner* — Edward Zee
(74) *Attorney, Agent, or Firm* — Finnegan, Henderson, Farabow, Garrett & Dunner, LLP

(57) ABSTRACT

This disclosure relates to method and system for certificate-less security management of interconnected hybrid resources. The method includes selecting at least one hybrid resource from a plurality of hybrid resources in network to install pre-calculated security configuration. The method further includes receiving a One Time Password (OTP) valid for pre-configured time period, in response to an identity generation request for a hybrid resource; installing security data payload including the OTP and the pre-calculated security configuration, in the hybrid resource; receiving an identity issuance request from the hybrid resource through a secure channel upon installation of security data payload in the hybrid resource; assigning unique identity to the hybrid resource upon successful validation of the OTP received in identity issuance request; and generating, upon assignment, metadata corresponding to the hybrid resource for a security association map (SAM) associated with the hybrid resource.

20 Claims, 14 Drawing Sheets

(52) U.S. Cl.
CPC ...... *H04L 63/0838* (2013.01); *H04L 63/0846* (2013.01); *H04L 63/0876* (2013.01); *H04L 2463/121* (2013.01)

(58) Field of Classification Search
CPC ..... H04L 63/0876; G06F 21/45; G06F 21/44; G06F 21/46
See application file for complete search history.

(56) References Cited

OTHER PUBLICATIONS

Chatterjee, U. et al., "PUFSSL: An OpenSSL Extension for PUF based Authentication," 2018 IEEE 23rd International Conference on Digital Signal Processing (DSP), Shanghai, China, 2018, pp. 1-5, doi: 10.1109/ICDSP.2018.8631814 (5 pages).

Slagell, A. et al., PKI Scalability Issues, 2004 (24 pages).

Vibe Cybersecurity, https://vibecyber.com/ (last accessed Feb. 2011) (17 pages).

Shimaoka, M., Memorandum for multi-domain Public Key Infrastructure (PKI) Interoperability, IETF Network Working Group, SECOM Trust.net (Oct. 2003) (26 pages).

* cited by examiner

SYSTEM AND METHOD FOR CERTIFICATE-LESS SECURITY MANAGEMENT OF INTERCONNECTED HYBRID RESOURCES

TECHNICAL FIELD

This disclosure relates generally to networks including hybrid resources, and more particularly to method and system for certificate-less security management of interconnected hybrid resources.

BACKGROUND

A plant or an enterprise using digital assets such as COBOTS, Digital Twins, etc., operates in an environment using hybrid resources. Hybrid resources are typically physical and virtual infrastructures and assets or objects. Hybrid resources originate from various secondary stakeholders, such as computing service providers, telecommunication infrastructure, and network equipment and technology providers.

The solutions employing digital assets require a strong identity and authentication mechanism for the hybrid resources. Various providers have varied security mechanisms and making it difficult to integrate into a single security mechanism and secure storage of private keys for identity. In cases where all the providers use a single security mechanism, there still exists a problem of integrating the root which vary across the providers. Large scale implementation requires real-time identity issuance, provisioning validation of chain-of-trust and related life-cycle management technology which may operate at scale and in distributed deployment model.

Current Public Key Infrastructure (PKI)-based solutions in-hand mandates a need of central certificate-authority for identity issuance, provisioning, validation of chain-of-trust, and life-cycle management activities. Centralized and hierarchical nature of PKI architecture presents a performance and scalability challenge and shows limitation in trust validation and orchestration for different domains.

There is therefore a need in the present state of art for methods and systems to provide a scalable, certificate-less, and decentralized means for managing security among interconnected hybrid resources of an enterprise.

SUMMARY

In one embodiment, a method of certificate-less security management of interconnected hybrid resources is disclosed. In one example, the method includes selecting at least one hybrid resource from a plurality of hybrid resources in a network to install a pre-calculated security configuration. For each of the at least one hybrid resource, the method further includes receiving a One Time Password (OTP) valid for a pre-configured time period, in response to an identity generation request for a hybrid resource. The OTP is generated based on an availability of a free identity block corresponding to the hybrid resource in an identity repository. The identity repository stores identities associated with the plurality of hybrid resources in the network. For each of the at least one hybrid resource, the method further includes installing a security data payload including the OTP and the pre-calculated security configuration, in the hybrid resource. For each of the at least one hybrid resource, the method further includes receiving an identity issuance request from the hybrid resource through a secure channel upon installation of the security data payload in the hybrid resource. The identity issuance request includes the OTP. For each of the at least one hybrid resource, the method further includes assigning a unique identity to the hybrid resource upon successful validation of the OTP received in the identity issuance request. The unique identity is securely stored in the identity repository. For each of the at least one hybrid resource, the method further includes generating, upon assignment, metadata corresponding to the hybrid resource for a Security Association Map (SAM) associated with the hybrid resource. The SAM is associated at a level of one of segments of the hybrid resource or network of multiple segments.

In one embodiment, a system for certificate-less security management of interconnected hybrid resources is disclosed. In one example, the system includes an orchestrator. The orchestrator is configured to select at least one hybrid resource from a plurality of hybrid resources in a network to install a pre-calculated security configuration. For each of the at least one hybrid resource, the orchestrator is further configured to receive an OTP valid for a pre-configured time period, in response to an identity generation request for a hybrid resource. The OTP is generated based on an availability of a free identity block corresponding to the hybrid resource in an identity repository. The identity repository stores identities associated with the plurality of hybrid resources in the network. For each of the at least one hybrid resource, the orchestrator is further configured to install a security data payload including the OTP and the pre-calculated security configuration, in the hybrid resource. The system further includes a security provider. For each of the at least one hybrid resource, the security provider is configured to receive an identity issuance request from the hybrid resource through a secure channel upon installation of the security data payload in the hybrid resource. The identity issuance request includes the OTP. For each of the at least one hybrid resource, the security provider is configured to assign a unique identity to the hybrid resource upon successful validation of the OTP received in the identity issuance request. The unique identity is securely stored in the identity repository and the hybrid resource. For each of the at least one hybrid resource, the security provider is configured to generate, upon assignment, metadata corresponding to the hybrid resource for a SAM associated with the hybrid resource. The SAM is associated at a level of one of segments of the hybrid resource or network of multiple segments.

In one embodiment, a non-transitory computer-readable medium storing computer-executable instructions for certificate-less security management of interconnected hybrid resources is disclosed. In one example, the stored instructions, when executed by a processor, causes the processor to perform operations including selecting at least one hybrid resource from a plurality of hybrid resources in a network to install a pre-calculated security configuration. For each of the at least one hybrid resource, the operations further include receiving an OTP valid for a pre-configured time period, in response to an identity generation request for a hybrid resource. The OTP is generated based on an availability of a free identity block corresponding to the hybrid resource in an identity repository. The identity repository stores identities associated with the plurality of hybrid resources in the network. For each of the at least one hybrid resource, the operations further include installing a security data payload comprising the OTP and the pre-calculated security configuration, in the hybrid resource. For each of the at least one hybrid resource, the operations further include receiving an identity issuance request from the hybrid resource through a secure channel upon installation of the security data payload in the hybrid resource. The identity issuance request includes the OTP. For each of the at least one hybrid resource, the operations further include assigning a unique identity to the hybrid resource upon successful validation of the OTP received in the identity issuance request. The unique identity is securely stored in the identity repository and the hybrid resource. For each of the at least one hybrid resource, the operations further include generating, upon assignment, metadata corresponding to the hybrid resource for a SAM associated with the hybrid resource. The SAM is associated at a level of one of segments of the hybrid resource or network of multiple segments.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
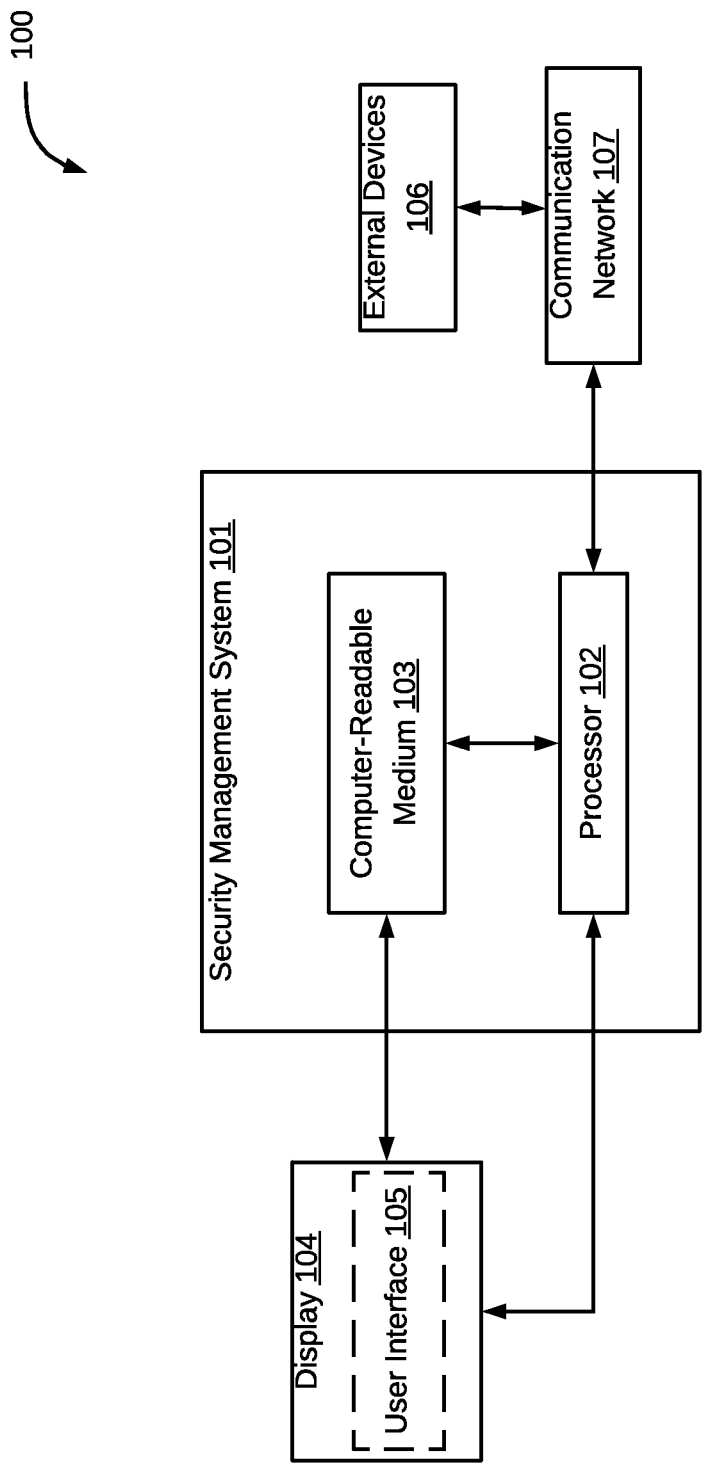
FIG. 1 is a block diagram of an exemplary system for certificate-less security management of interconnected hybrid resources, in accordance with some embodiments of the present disclosure.

Referring now to FIG. 1, an exemplary system 100 for certificate-less security management of interconnected hybrid resources is illustrated, in accordance with some embodiments of the present disclosure. The system 100 may implement in an enterprise, in accordance with some embodiments of the present disclosure. The enterprise may perform certificate-less security management of a plurality of interconnected resources. In particular, the system 100 may include a security management system 101 (for example, one or more of servers, desktops, laptops, notebooks, netbooks, tablets, smartphones, mobile phones, any other computing devices or a combination thereof) that may be implemented within the enterprise. The security management system 101 may include an orchestrator and a security provider (not shown in figure). It should be noted that, in some embodiments, the security management system 101 may install a security data payload in a hybrid resource. The security data payload is an application package and may include a One Time Password (OTP) and a pre-calculated security configuration (e.g., default security configuration present in an orchestrator). It should be noted that, in some embodiments, the OTP may be valid for a pre-configured time period. By way of an example, the hybrid resource may be a computing device such as, but not limited to, one or more of servers, desktops, laptops, notebooks, netbooks, tablets, smartphones, mobile phones, any other computing devices or a combination thereof. Further, the security management system may assign a unique identity to a hybrid resource upon validating the OTP. Further, the security management system 101 may generate metadata corresponding to the hybrid resource for a Security Association Map (SAM) associated with the hybrid resource. Further, the hybrid resource may establish a secure communication channel with other hybrid resources through the SAM associated with the hybrid resource and the other hybrid resources.

As will be described in greater detail in conjunction with FIGS. 2-16, the security management system may select at least one hybrid resource from a plurality of hybrid resources in a network to install a pre-calculated security configuration. For each of the at least one hybrid resource, the security management system may further receive a One Time Password (OTP) valid for a pre-configured time period, in response to an identity generation request for a hybrid resource. The OTP is generated based on an availability of a free identity block corresponding to the hybrid resource in an identity repository. The free identity block corresponds to an unreserved identity block that may be subsequently assigned to the hybrid resource. The identity repository stores identities associated with the plurality of hybrid resources in the network. For each of the at least one hybrid resource, the security management system may further install a security data payload including the OTP and pre-configured the security configuration, in the hybrid resource. For each of the at least one hybrid resource, the security management system may further receive an identity issuance request from the hybrid resource through a secure channel upon installation of the security data payload in the hybrid resource. The identity issuance request includes the OTP. For each of the at least one hybrid resource, the security management system may further assign a unique identity to the hybrid resource upon successful validation of the OTP received in the identity issuance request. The unique identity is securely stored in the identity repository and the hybrid resource. For each of the at least one hybrid resource, the security management system may further generate, upon assignment, metadata corresponding to the hybrid resource for a SAM associated with the hybrid resource. The SAM is associated at a level of one of the hybrid resource or the network.

In some embodiments, the security management system 101 may include one or more processors 102 and a computer-readable medium 103 (for example, a memory). The computer-readable medium 103 may include the security data payload which may include the OTP. Further, the computer-readable storage medium 103 may store instructions that, when executed by the one or more processors 102, cause the one or more processors 102 to assign a unique identity to a hybrid resource, generate metadata corresponding to the hybrid resource for a SAM associated with the hybrid resource, and establish a secure communication channel between at least two hybrid resources through the SAM associated with the at least two hybrid resources, in accordance with aspects of the present disclosure. The computer-readable storage medium 103 may also store various data (for example, the unique identity associated with each of a plurality of hybrid resources, the metadata, SAM associated with the hybrid resources, SAM associated at the level of the network, and the like) that may be captured, processed, and/or required by the system 100.

The system 100 may further include a display 104. The system 100 may interact with a user via a user interface 105 accessible via the display 104. The system 100 may also include one or more external devices 106. In some embodiments, the security management system 101 may interact with the one or more external devices 106 over a communication network 107 for sending or receiving various data. The external devices 106 may include, but may not be limited to, a remote server, a digital device, or another computing system.

Figure 2:
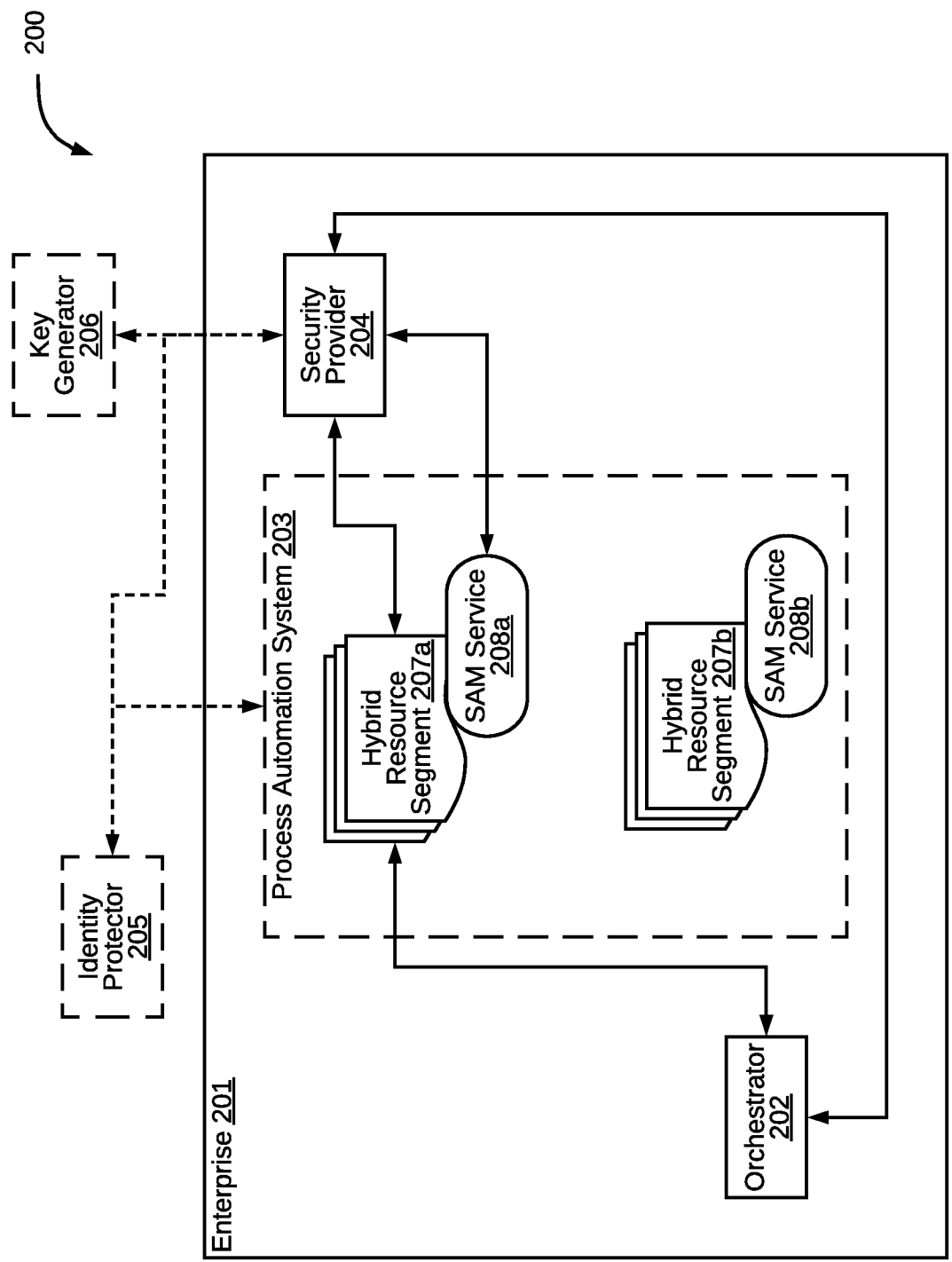
FIG. 2 is a functional block diagram of a security management system implemented by the exemplary system of FIG. 1, in accordance with some embodiments of the present disclosure.

Referring now to FIG. 2, a functional block diagram of a security management system 200 (analogous to the security management system 101 implemented by the system 100) is illustrated, in accordance with some embodiments of the present disclosure. The security management system 200 includes, within an enterprise 201, an orchestrator 202, a process automation system 203, and a security provider 204. The security management system 200 further includes an identity protector 205 and a key generator 206. The enterprise may be an organization or a plant. In an embodiment, the process automation system 203 includes a plurality of hybrid resource segments (for example, a hybrid resource segment 207a and a hybrid resource segment 207b). Further, a Security Association Map (SAM) service may be associated with each of the plurality of hybrid resource segments. By way of an example, a SAM service 208a may be associated with the hybrid resource segment 207a and a SAM service 208b may be associated with the hybrid resource segment 207b.

In an embodiment, the process automation system 203 performs business functions of the enterprise 201. Further, each of the hybrid resource segment 207a and the hybrid resource segment 207b may include a plurality of hybrid resources and services. Each of the plurality of hybrid resources is a physical or a virtual entity performing at least one functionality of the enterprise 201. It may be noted that the plurality of hybrid resource segments may be distributed in nature and interconnected in a network. Further, the plurality of hybrid resources and the services within a hybrid resource segment may be interconnected through a common network. Further, a SAM service (not shown in figure) may facilitate cross segment data flow and enterprise functionalities requiring cross segment communication. This has been discussed in detail in conjunction with FIG. 5. For example, the hybrid resource segment 207a may communicate with the hybrid resource segment 207b through the SAM service 208a and the SAM service 208b, respectively.

The orchestrator 202 may manage installation and configuration of the plurality of hybrid resources of the process automation system 203 in a dynamic environment. In an embodiment, the security management system includes one or more orchestrators. In an exemplary scenario, the process automation system 203 may initiate a new hybrid resource node dynamically when load in the enterprise 201 is above a predefined threshold. In such a scenario, the orchestrator 202 dynamically manages the plurality of hybrid resources. The orchestrator 202 applies rules and policies of the enterprise 201. Further, the orchestrator 202 may access an application store including a superset of functional elements required by the process automation system 203. Further, the orchestrator packages a hybrid resource image and deploys the hybrid resource image in a suitable hybrid resource of a hybrid resource segment (for example, the hybrid resource segment 207a).

The security provider 204 assigns unique identities to hybrid resources and generates metadata to be installed into appropriate SAM service. Based on a role of the enterprise

201, a segmentation criteria for distributing the plurality of hybrid resources into the plurality of hybrid resource segments may be determined. By way of an example, when the enterprise 201 is a factory, the segmentation criteria may be disjoint functional features of the plurality of hybrid resources. By way of another example, when the enterprise 201 is a telecom infrastructure provider, segmentation criteria may be defined by geography and density of customers in each of the plurality of hybrid resource segments. Further, the enterprise 201 may include security requirements for security enablement of the plurality of hybrid resources. By way of an example, the security requirements may include, but may not be limited to, integrity of application and softwares which may be deployed into the network, secure provisioning of the plurality of hybrid resources, secure communication between the plurality of hybrid resources, and the like. Further, the enterprise 201 may require a security provider operating at an enterprise level and scalable enough to address dynamic load in the enterprise 201 with high performance.

The security provider 204 addresses the security requirements of the plurality of hybrid resources by issuing a unique identity to each of the plurality of hybrid resources, defining an eco-system for identity verification process, and establishing a secure data channel upon authenticating communicating hybrid resources in a dynamic environment. Further, the security provider 204 may interact with the orchestrator 202, hybrid resource segment-level services, network-level services, and the plurality of hybrid resource segments via various connectors. Additionally, the security provider 204 may interact with external entities (such as the identity protector 205 and the key generator 206) to achieve overall functionalities. The identity protector 205 stores information of the enterprise 201 in an encrypted form. It may be noted that the identity protector 205 may not require a hardware module to store a key. In an embodiment, the identity protector 205 runs on environment of a hybrid resource. The key generator 206 provides symmetric key to the security provider 204 on demand. By way of an example, the key generator 206 may be a key vault, such as Google® key vault. It may be noted that the security management system 200 is multi-tenant and may work in a distributed mode serving different tenant of platform and applications. Further, multi-tenancy may allow a seamless authentication and access-control across multiple trust domain.

It should be noted that all such aforementioned modules 201-206 may be represented as a single module or a combination of different modules. Further, as will be appreciated by those skilled in the art, each of the modules 201-206 may reside, in whole or in parts, on one device or multiple devices in communication with each other. In some embodiments, each of the modules 201-206 may be implemented as dedicated hardware circuit comprising custom application-specific integrated circuit (ASIC) or gate arrays, off-the-shelf semiconductors such as logic chips, transistors, or other discrete components. Each of the modules 201-206 may also be implemented in a programmable hardware device such as a field programmable gate array (FPGA), programmable array logic, programmable logic device, and so forth. Alternatively, each of the modules 201-206 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for certificate-less security management of interconnected hybrid resources. For example, the exemplary system 100 and the associated security management system 101, 200 may establish secure communication channels between hybrid resources by the processes discussed herein. In particular, as will be appreciated by those of ordinary skill in the art, control logic and/or automated routines for performing the techniques and steps described herein may be implemented by the system 100 and the associated security management system 101, 200 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
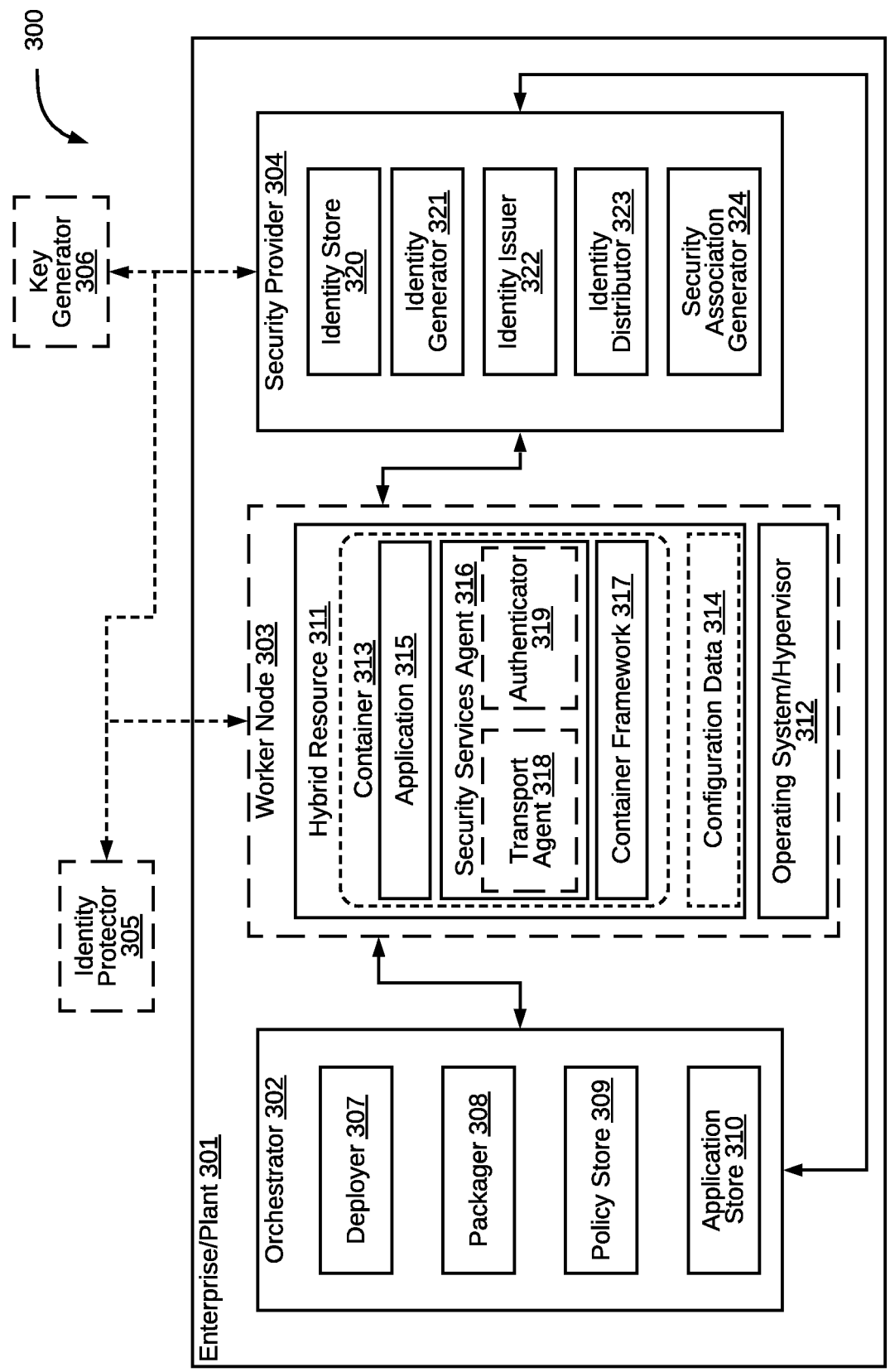
FIG. 3 is a detailed functional block diagram of a security management system implemented by the exemplary system of FIG. 1, in accordance with some embodiments of the present disclosure.

Referring now to FIG. 3, a detailed functional block diagram of a security management system 300 (analogous to the security management system 101 implemented by the system 100) is illustrated, in accordance with some embodiments of the present disclosure. The security management system 300 includes, within an enterprise/plant 301 (enterprise 301 hereinafter), an orchestrator 302, a worker node 303, and a security provider 304. It may be noted that a hybrid resource may be contained within the worker node 303. The security management system 300 further includes an identity protector 305 and a key generator 306. The orchestrator 302 and the security provider 304 may be analogous to the orchestrator 202 and the security provider 204, respectively, of the security management system 200.

In an embodiment, the orchestrator 302 includes a deployer 307, a packager 308, a policy store 309, and an application store 310. The deployer 307 interacts with the worker node 303 and deploys a container package implementing a functionality of the hybrid resource 311. Further, the deployer 307 may coordinate with the security provider 304 to ensure identity for application is reserved and provisioned. The deployer 307 receives the container package from the packager 308. Further, the deployer 307 receives an OTP (i.e., authentication information) valid for a pre-configured time period from the security provider 304. It should be noted that OTP may include any unique authentication passcode (e.g., numeric, alphanumeric, etc.) that is generated in real-time and is valid for a pre-configured time. Further, it should be noted that the OTP may be generated using any existing or proprietary authentication passcode generating mechanism. The deployer 307 provides the OTP to the packager 308. The packager 308 packages the container 313 which may be used to create hybrid resource. It may be noted that the packager 308 packages the OTP within a final package of the hybrid resource 311. The application store 310 stores applications selected by the enterprise 301. It may be noted that the application store 310 is a superset of enterprise functionalities. The policy store 309 stores enterprise policies for each of the plurality of hybrid resources of the enterprise 301. It may be noted that a policy defines whether a hybrid resource is allowed to communicate with another hybrid resource. The enterprise policies are enforced into the hybrid resource network in consultation with security provider 304.

The worker node 303 may be a physical or a virtual environment hosting one or more hybrid resources. The worker node 303 includes a hybrid resource 311 and an Operating System (OS)/hypervisor 312. Further, the hybrid resource 311 includes a container 313 and configuration data 314. The container 313 includes an application 315, a Security Services Agent (SSA) 316, and a container framework 317. The application 315 may include a functionality of the enterprise 301 which the hybrid resource 311 is required to perform. The SSA 316 is a software agent installed on the hybrid resource 311 which follows an eco-system defined by the security provider 304 and addresses security requirements of the application 315 by supporting node identity, peer authentication, and establishing a secure communication channel with a peer. The SSA 316 includes a transport agent 318 and an authenticator 319. It may be noted that the authenticator 319 validates a unique identity of the peer. This is discussed in detail in conjunction with FIG. 4. The transport agent 318 is a customized version of software Transport Layer Security (TLS) library used to establish a secure communication channel between peers without using a Public Key Infrastructure (PKI)-based certificate. It should be noted that the custom TLS may use the authenticator 319 for authentication by the peers that may be one or more of the plurality of hybrid resources. The configuration data 314 stores the data based on functionality implemented by the application 315. It may be noted that the configuration data 314 may be a file system accessible to the container 313. The container framework 317 is an environment of the container 313 where the application 315 and other executables may be executed.

The security provider 304 includes an identity store 320, an identity generator 321, an identity issuer 322, an identity distributor 323, and a security association generator 324. The identity store 320 (for example, a database) stores the identities associated with the plurality of hybrid resources. The security of the identity store 320 is ensured by the identity protector 305. An agent of the identity protector 305 executes on the identity store 320. The identity generator 321 generates raw identities in bulk with the key generator 306. In an embodiment, the identity generator 321 requests and receives one key from the key generator 306. Further, the identity generator 321 uses internal algorithms to generate raw identities in bulk. The identity issuer 322 randomly selects an identity from a pre-reserved set of identities for the hybrid resource 311 and shares the identity with the hybrid resource 311. The identity distributor 323 reserves a pre-defined number of identities from available identities in the identity store 320 for the hybrid resource 311. It may be noted that one of the reserved identities may be actually assigned to the hybrid resource 311 at a given point of time. The security association generator 324 is invoked by the deployer 307 of the orchestrator 302 upon identity issuance to the SSA 316 to enforce policy for the hybrid resource 311. The security association generator 324 generates metadata which may be interpreted by the plurality of hybrid resources for communication. Further, the metadata is sent to the SAM service. This is described in detail in conjunction with FIG. 4.

It should be noted that all such aforementioned modules 302-324 may be represented as a single module or a combination of different modules. Further, as will be appreciated by those skilled in the art, each of the modules 302-324 may reside, in whole or in parts, on one device or multiple devices in communication with each other. In some embodiments, each of the modules 302-324 may be implemented as dedicated hardware circuit comprising custom application-specific integrated circuit (ASIC) or gate arrays, off-the-shelf semiconductors such as logic chips, transistors, or other discrete components. Each of the modules 302-324 may also be implemented in a programmable hardware device such as a field programmable gate array (FPGA), programmable array logic, programmable logic device, and so forth. Alternatively, each of the modules 302-324 may be implemented in software for execution by various types of processors (e.g., processor 102). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 4:
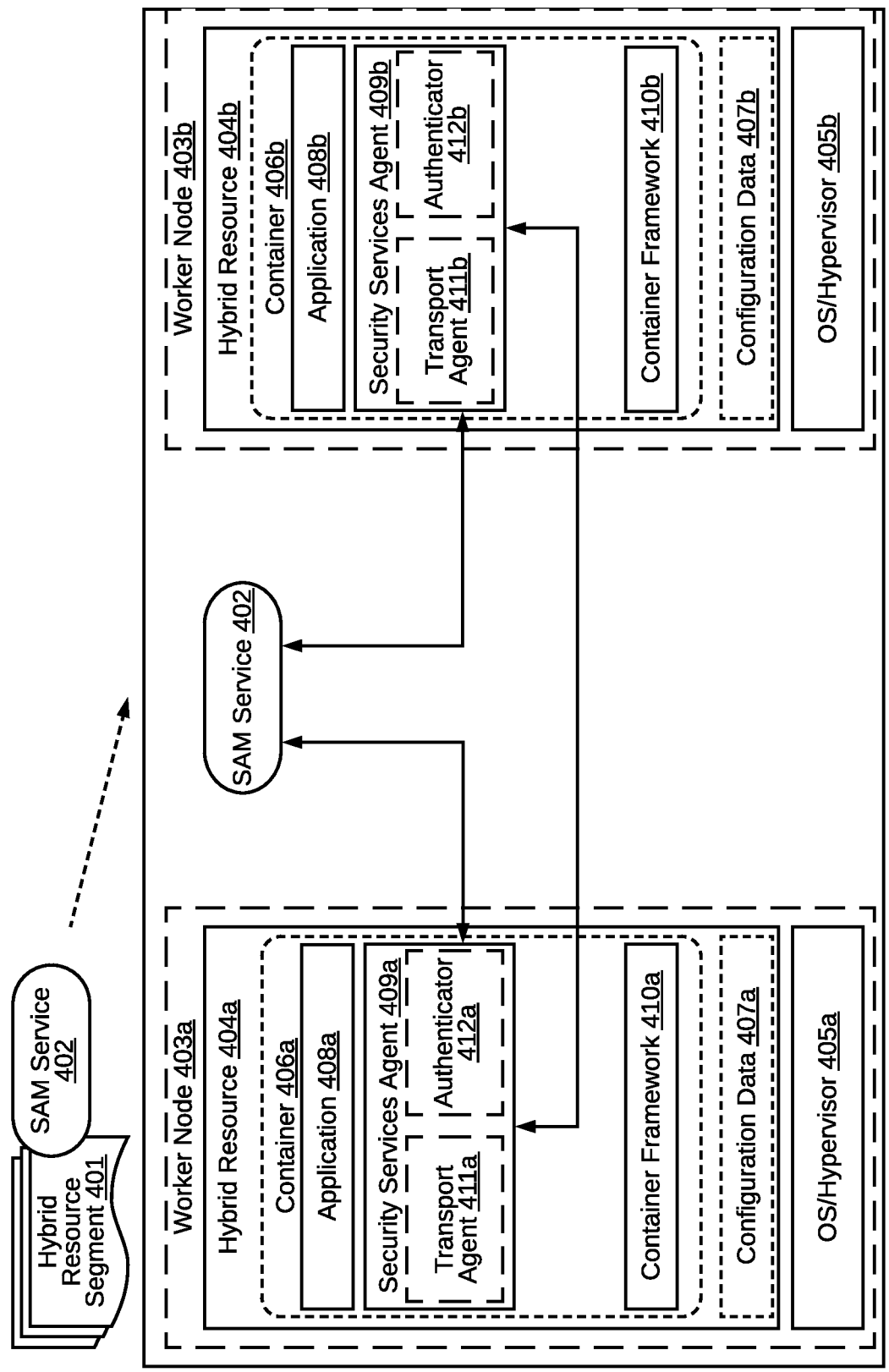
FIG. 4 illustrates communication between hybrid resources of a hybrid resource segment, in accordance with some embodiments of the present disclosure.

Referring now to FIG. 4, communication between hybrid resources of a hybrid resource segment 401 is illustrated, in accordance with some embodiments of the present disclosure. A SAM service 402 is associated with the hybrid resource segment 401. The hybrid resource segment 401 includes a plurality of worker nodes (such as a worker node 403a and a worker node 403b). Each of the worker node 403a and the worker node 403b may be analogous to the worker node 303 of the security management system 300. In an embodiment, the worker node 403a includes a hybrid resource 404a and an OS/hypervisor 405a. The worker node 403b includes a hybrid resource 404b and an OS/hypervisor 405b. Further, the hybrid resource 404a includes a container 406a and configuration data 407a. The container 406a includes an application 408a, a Security Services Agent (SSA) 409a, and a container framework 410a. The SSA 409a includes a transport agent 411a and an authenticator 412a. The authenticator 412a interprets the metadata corresponding to the hybrid resource 404a and the hybrid resource 404b stored in the SAM service 402 using a unique identity for the hybrid resource 404a and thereby validates the unique identity and authenticates the worker node 403b. Similarly, the authenticator 412b interprets the metadata corresponding to the hybrid resource 404b and the hybrid resource 404a stored in the SAM service 402 using a unique identity for the hybrid resource 404b and thereby validates the unique identity and authenticates the worker node 403a. The transport agent 411a and the transport agent 411b are custom versions of TLS libraries. In an embodiment, the transport agent 411a and the transport agent 411b are added using additional plugins. The transport agent 411a and the transport agent 411b use the authenticator 412a and the authenticator 412b for worker node authentication, avoiding certificate-based authentication.

Additionally, the hybrid resource 404b includes a container 406b and configuration data 407b. The container 406b includes an application 408b, an SSA 409b, and a container framework 410b. The SSA 409b includes a transport agent 411b and an authenticator 412b. The SAM service 402 is a segment level service storing the metadata to enable authentication and unique identity validation between the hybrid resource 404a and the hybrid resource 404b. As has been discussed in conjunction with FIG. 3, the metadata is generated by the security association generator upon request from the deployer in the orchestrator.

Figure 5:
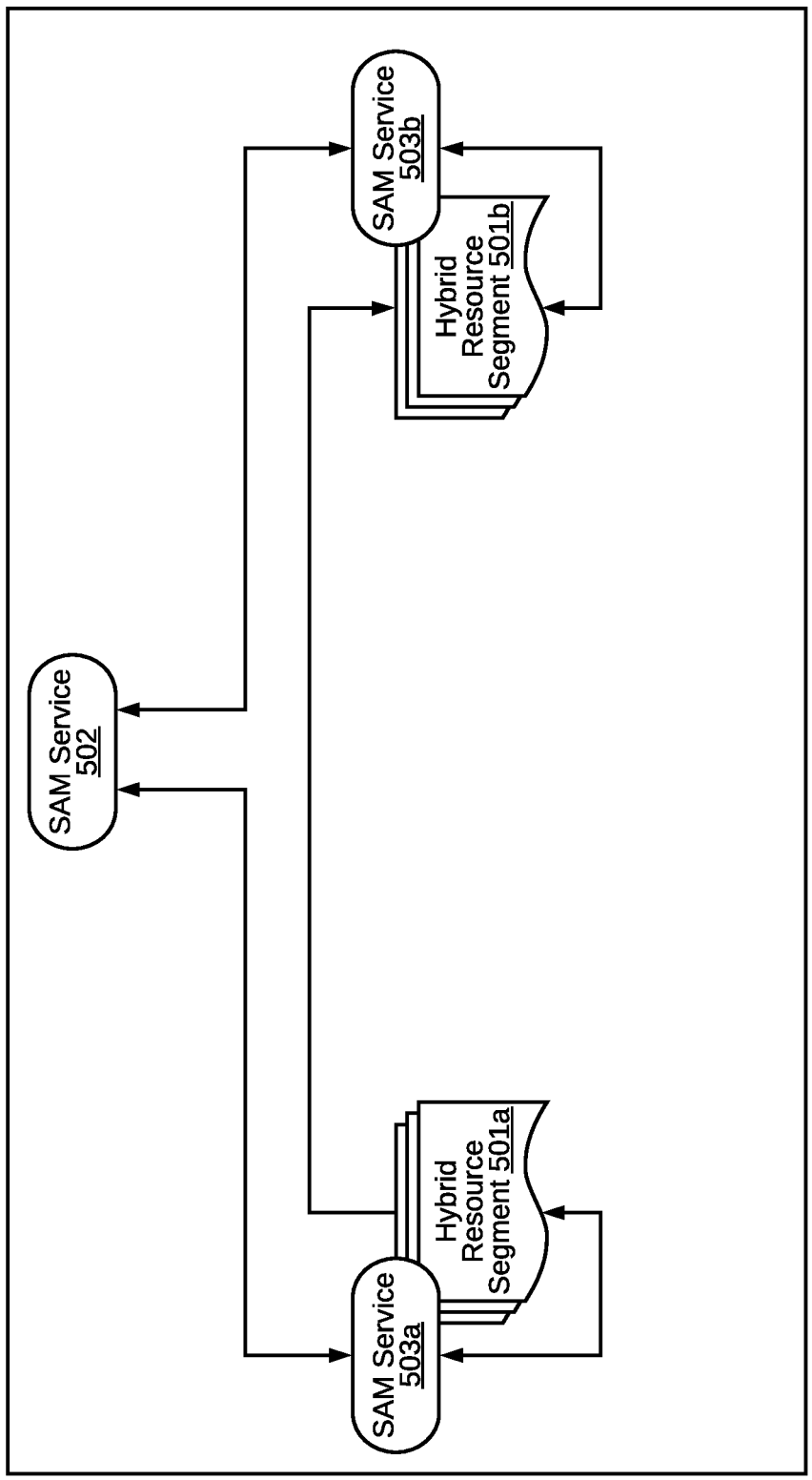
FIG. 5 illustrates communication between a hybrid resource of a first hybrid resource segment with a hybrid resource of a second hybrid resource segment, in accordance with some embodiments of the present disclosure.

Referring now to FIG. 5, communication between a hybrid resource of a first hybrid resource segment 501a with a hybrid resource of a second hybrid resource segment 501b is illustrated, in accordance with some embodiments of the present disclosure. Inter-segment communication between hybrid resources is facilitated by a SAM service 502. It may be noted that the SAM service 502 operates at a network level and stores metadata for inter-segment node communication (such as, the communication between the hybrid resource of the first hybrid resource segment 501a with the hybrid resource of the second hybrid resource segment 501b. Each of the first hybrid resource segment 501a and the second hybrid resource segment 501b includes a plurality of hybrid resources. Further, the first hybrid resource segment 501a is associated with a SAM service 503a and the second hybrid resource segment 501b is associated with a SAM service 503b. The SAM service 503a and the SAM service 503b facilitate communication between the plurality of hybrid resources within the hybrid resource segment 501a and the hybrid resource segment 501b, respectively. SAM service 502 operating at inter-segment level stores the metadata. Individual hybrid resources still interact with a segment level SAM service (such as the SAM service 503a and the SAM service 503b). Further, the segment-level SAM services may interact with a higher level SAM service (such as the SAM service 502) based on a location of peer worker node.

Figure 6:
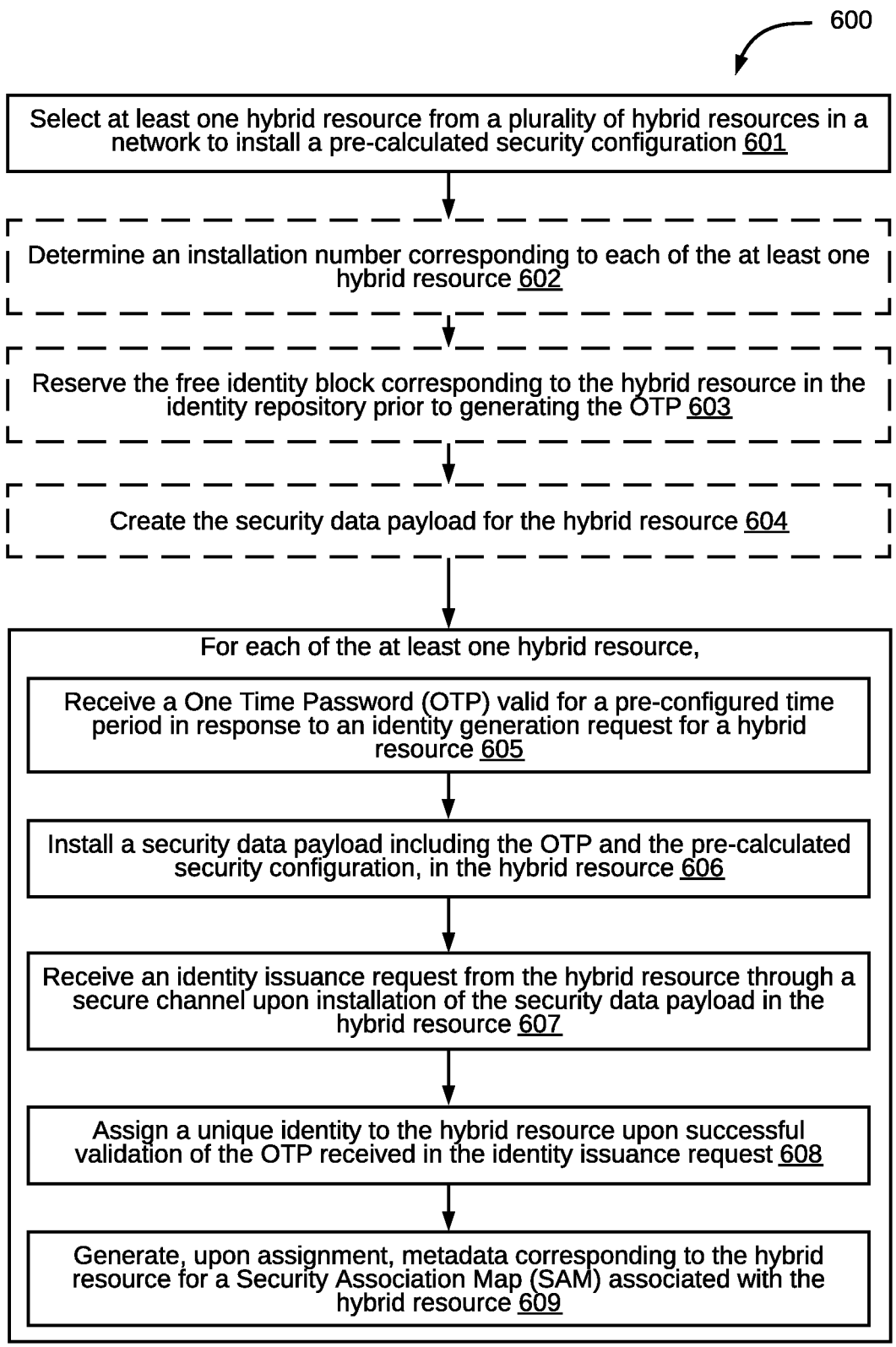
FIG. 6 illustrates a flow diagram of an exemplary process for certificate-less security management of interconnected hybrid resources, in accordance with some embodiments of the present disclosure.

Referring now to FIG. 6, an exemplary process 600 for certificate-less security management of interconnected hybrid resources is depicted via a flowchart, in accordance with some embodiments of the present disclosure. In an embodiment, the process 600 may be implemented by the security management system 101. The process 600 may include selecting at least one hybrid resource (for example, the hybrid resource 311) from a plurality of hybrid resources in a network to install a pre-calculated security configuration, at step 601. By way of an example, a pre-calculated security configuration may be IP address of a SAMDB for a specific hybrid resource. In an embodiment, the pre-calculated security configuration may be installed by the deployer 307 of the orchestrator 302. Further, the process 600 may include determining the installation number corresponding to each of the at least one hybrid resource, at step 602. Further, the process 600 may include reserving the free identity block corresponding to the hybrid resource in the identity repository (for example, the identity store 320) prior to generating an OTP, at step 603. Further, the process 600 may include creating the security data payload for the hybrid resource, at step 604. The OTP and the pre-calculated security configuration are packaged within the security data payload. In an embodiment, the security data payload is packaged by the packager 308 of the orchestrator 302. In an embodiment, to ensure uniqueness of OTP, the orchestrator 302 may generate an identity creation request with unique attributes including, but not limited to, initiator-universally unique identifier (UUID), installation number and endpoint registry-id and/orasset-id. The aforesaid attributes may be used by the identity generator 321 to compute a time-bound OTP including True Random Number Generator/Quantum Random Number Generator (TRNG/QRNG) of the identity generator 321. Further, while the OTP is generated by the security provider 304, a unique context may be created by the security provider 304, using the unique attributes passed by the orchestrator 302. Further, an SSA 316 within the application 315 passes the OTP to the security provider 304 while requesting identity issuance. The identity issuance request includes additional unique information as originally sent by the orchestrator 302 along with the OTP. The security provider 304 checks the validity of OTP and validates context for which OTP is generated.

It may be noted that for the free identity block of the hybrid resource, the identity repository includes an installation number, a symmetric key, identity issuing entity information, a challenge and response pair, the OTP, and an expiry timestamp of the unique identity.

Further, for each of the at least one hybrid resource, the process 600 may include receiving an OTP valid for a pre-configured time period in response to an identity generation request for a hybrid resource, at step 605. The OTP is generated based on an availability of a free identity block corresponding to the hybrid resource in an identity repository. The identity repository stores identities associated with the plurality of hybrid resources in the network. Further, for each of the at least one hybrid resource, the process 600 may include installing a security data payload including the OTP and the pre-calculated security configuration, in the hybrid resource, at step 606. By way of an example, the security data payload may be installed in the hybrid resource 311 by the deployer 307.

Further, for each of the at least one hybrid resource, the process 600 may include receiving an identity issuance request from the hybrid resource through a secure channel upon installation of the security data payload in the hybrid resource, at step 607. The identity issuance request includes the OTP. Further, for each of the at least one hybrid resource, the process 600 may include assigning a unique identity to the hybrid resource upon successful validation of the OTP received in the identity issuance request, at step 608. The unique identity is securely stored in the identity repository. Additionally, the unique identity is securely stored in the hybrid resource. In continuation of the example above, the identity distributor 323 may reserve a pre-defined number of identities from available identities in the identity store 320 for the hybrid resource 311. The identity issuer 322 may randomly select an identity from the reserved set of identities and share the identity with the hybrid resource 311. Further, for each of the at least one hybrid resource, the process 600 may include generating, upon assignment, metadata corresponding to the hybrid resource for a SAM associated with the hybrid resource, at step 609. The SAM is associated at a level of one of the hybrid resource (for example, the SAM service 503a and the SAM service 503b) or the network (for example, the SAM service 502).

Figure 7:
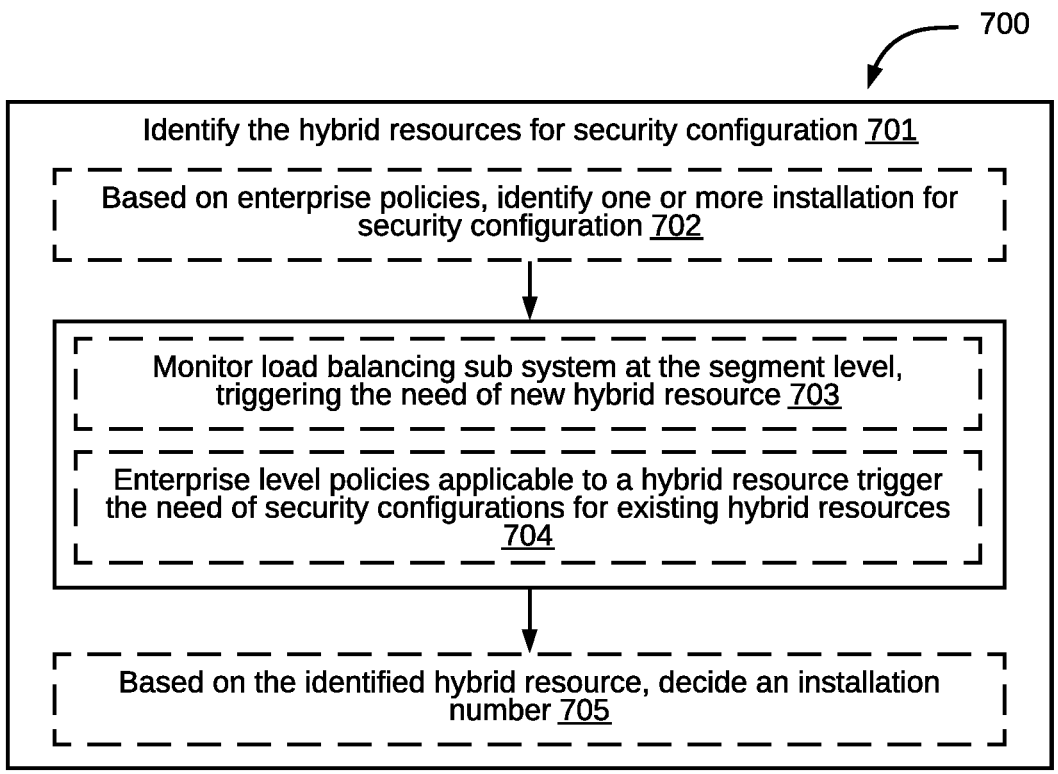
FIG. 7 illustrates a flow diagram of an exemplary process for selecting hybrid resources to install a pre-calculated security configuration, in accordance with some embodiments of the present disclosure.

Referring now to FIG. 7, an exemplary process 700 for selecting hybrid resources to install a security configuration is depicted via a flowchart, in accordance with some embodiments of the present disclosure. In an embodiment, the process 700 may be implemented by the security management system 101. The process 700 may include identifying the hybrid resources for security configuration, at step 701. Further, the step 701 of the process 700 includes based on enterprise policies, identifying one or more installation for security configuration, at step 702. The installation may be a new hybrid resource or a hybrid resource from the plurality of hybrid resources in the network. The enterprise 301 may decide security configuration of a new hybrid resource based on rules, policies, and any other internal or external inputs. Further, the step 701 of the process 700 includes monitoring load balancing sub-system at the segment level, triggering a requirement of a new hybrid resource, at step 703. The load balancing sub-system may be monitored by the process automation system 203. The process automation system 203 may trigger a request to initiate a new hybrid resource of a required functionality. The trigger may be processed by the orchestrator 202. Further, the step 701 of the process 700 includes triggering the need of security configurations for existing hybrid resources through enterprise level policies applicable to a hybrid resource, at step 704.

Further, the step 701 of the process 700 includes based on the identified hybrid resource, determining an installation number, at step 705. The orchestrator 202 may either uniquely identify the existing hybrid resource or generate an installation number for the hybrid resource to be deployed. The hybrid resource may be a hybrid resource in the network or new hybrid resource. The installation number represents information that includes, but is not limited to, an application identity, a date and a time of installation, a network segment identification. The deployer 307 generates the installation number during new installation. Application identity is a unique alpha numeric identifier assigned by the enterprise 301 to each of a plurality of applications stored in the application store 310. A value of the date and time of installation may be set via a date and time Application Programming Interface (API) by the deployer 307 of a running environment. Network segment identification may be identified by the deployer 307 from a plurality of existing network segments. The orchestrator maintains information of a set of installations loaded in the system at a given point of time. Further, installation number may be provided to the hybrid resource 311 as a part of provisioning. Additionally, the installation number is accessible by the security provider 304 for cases when the security provider 304 issues a unique identity to the hybrid resource 311. The system behaves differently when it comes to security configuration if an installation is in a new hybrid resource as compared to an existing hybrid resource. This is further discussed in detail in conjunction with FIGS. 8-16.

Figure 8:
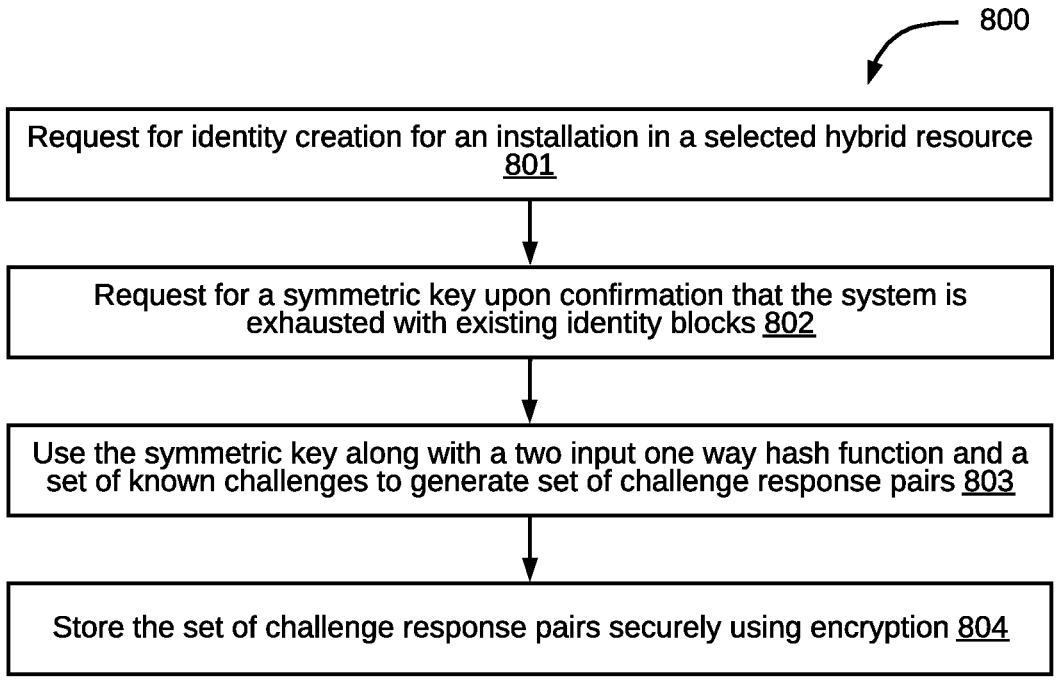
FIG. 8 illustrates a flow diagram of an exemplary process for generating a set of challenge and response pairs for hybrid resources, in accordance with some embodiments of the present disclosure.

Referring now to FIG. 8, an exemplary process 800 for generating a set of challenge and response pairs for hybrid resources is depicted via a flowchart, in accordance with some embodiments of the present disclosure. In an embodiment, the process 800 may be implemented by the security management system 101. The process 800 includes requesting for an identity creation for an installation in a selected hybrid resource, at step 801. The step 801 may be implemented by the deployer 307 of the orchestrator 302. The deployer 307 may send a request to the security provider 304 to create an identity for an installation. The input parameter passed to the security provider 304 is the installation number and installation context. The process 800 further includes requesting for a symmetric key upon confirmation that the system is exhausted with existing identity blocks, at step 802. The identity distributor 323 may internally check whether the identity store 320 includes a required number of free identities. The check is performed by executing a search of free identities in the identity store 320. When the required number of free identities is not available, the identity generator 321 invokes an external interface to fetch a symmetric key from the key generator 306. Further, the identity generator 321 uses the symmetric key to create a block of identities and stores the identities into the identity store 320. The process 800 further includes using the symmetric key along with a two input one-way hash function and a set of known challenges to generate set of challenge response pairs, at step 803. The identity may include a pair of challenge and response ({challenge, response}). This is further discussed in conjunction with FIG. 9.

Figure 9:
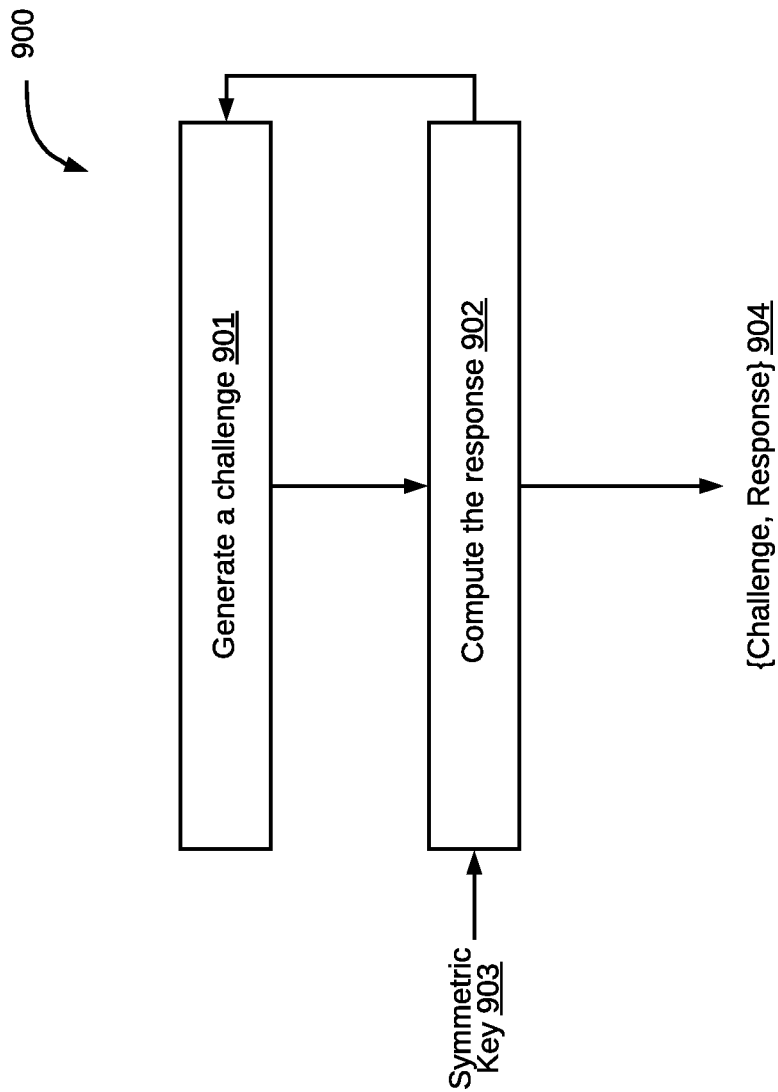
FIG. 9 illustrates a flow diagram of an exemplary control logic for generating a challenge and response pair for a hybrid resource, in accordance with some embodiments of the present disclosure.

Referring now to FIG. 9, an exemplary control logic 900 for generating a challenge and response pair 904 for a hybrid resource is depicted via a flowchart, in accordance with some embodiments of the present disclosure. In an embodiment, the control logic 900 may be implemented by the security management system 101. The control logic 900 includes generating a challenge, at step 901. Challenge is a 128-bit hexadecimal number. Further, the control logic 900 includes computing the response, at step 902. The response is computed using a cryptographic function using a symmetric key 903 as an input by the following equation:

$$\text{Response} = \text{HASH (Symmetric Key, Challenge)} \quad (1)$$

Where, HASH is a one-way cryptographic hash function, By way of an example, response is a 64 bit output of HASH( ).

Deployer 307 uses software logic to generate challenge strings of size 128 bit. By varying the Challenge input, various {Challenge, Response} pairs may be generated.

Referring back to FIG. 8, the process 800 further includes storing the set of challenge response pairs securely using encryption, at step 804. A triplet comprising a symmetric key, a challenge, and a response is securely saved into the identity store 320. The pair {challenge, response} serves as identity and is issued to the worker node 303. As the system may include a plurality of identities, the identity store 320 maintains various logical structures of information for overall execution of the system. Important elements of logical data structure of the identity store 320 are an installation ID, the symmetric key, dirty, the challenge, the response, and an expiry time stamp.

The installation ID represents the installation number as received from the deployer 307. The symmetric key represents the key received from the key generator 306. Dirty indicates whether a particular entity is used to issue an identity to the hybrid resource 311. Challenge and Response pair is generated by the identity generator 321. The expiry timestamp is attached to the identity as defined by the identity issuer 322, when an identity is issued to the hybrid resource 311. Entities with installation ID as NULL represent a free identity.

Figure 10:
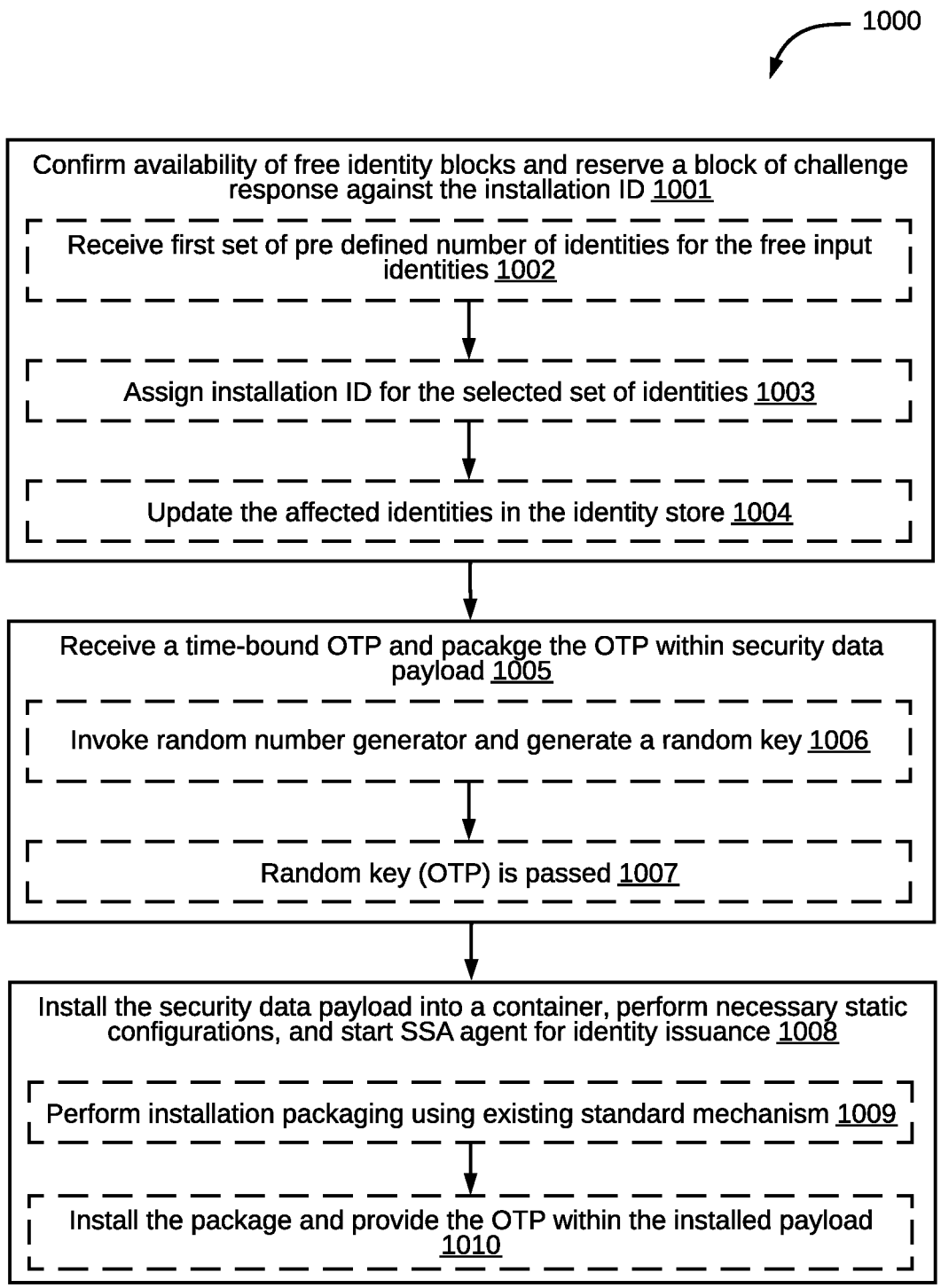
FIG. 10 illustrates a flow diagram of an exemplary process for distributing and providing a One Time Password (OTP) to a hybrid resource, in accordance with some embodiments of the present disclosure.

Referring now to FIG. 10, an exemplary process 1000 for distributing and providing an OTP to a hybrid resource is depicted via a flowchart, in accordance with some embodiments of the present disclosure. In an embodiment, the process 1000 may be implemented by the security management system 101. The process 1000 includes confirming availability of free identity blocks and reserving a block of challenge response against the installation ID, at step 1001. Once the unique identity is generated, a block of free identities is reserved for a requested installation. The identity distributor 323 reserves a set of identities corresponding to the requested installation and generates an OTP valid for a pre-configured time. Further, the identity distributor 323 saves the OTP for the reserved set of identities. Further, the step 1001 of the process 1000 may include receiving a first set of pre-defined number of identities for free input identities, at step 1002. Further, the step 1001 of the process may include assigning installation ID for the selected set of identities, at step 1003. Further, the step 1001 of the process 1000 may include updating the affected identities in the identity store, at step 1004.

Further, the process 1000 may include receiving a time-bound OTP and packaging the OTP within the security data payload, at step 1005. Upon reserving the identities, logical structure of the identity store 320 may be {Installation Id, Symmetric Key, Dirty, Challenge, Response, Expiry Time Stamp, OTP, OTP Expiry Timestamp}. Key changes in the logical structure includes addition of the OTP with each of the identities along with an expiry timestamp attached to the OTP. Further, the step 1005 of the process 1000 includes invoking a random number generator and generating a random key, at step 1006. By way of an example, value of the OTP is a 64-bit token randomly generated using a pseudo random number generator, readily available in execution environment of the security provider 304. Further, the step 1005 of the process 1000 includes passing the random key, at step 1007. The value of the OTP (random key) is returned to the deployer 307.

Further, the process 1000 includes installing the security data payload into a container, performing necessary static configurations, and starting SSA agent for identity issuance, at step 1008. Further, the step 1008 of the process 1000 includes performing installation packaging using existing standard mechanism, at step 1009. Further, the step 1008 of the process 1000 includes installing the package and provision the OTP within the installed payload, at step 1010. Identity provisioning is performed to include received OTP into the final package that the orchestrator 302 may install into the network. The packager 308 of the orchestrator 302 performs the required packaging using existing standard packaging methodology and inserts the OTP into the installed package, followed by deployment executed by the deployer 307 and initiation of the installation. The SSA 316 installed through the package is required to provide the OTP and ensure that an identity is issued.

Figure 11:
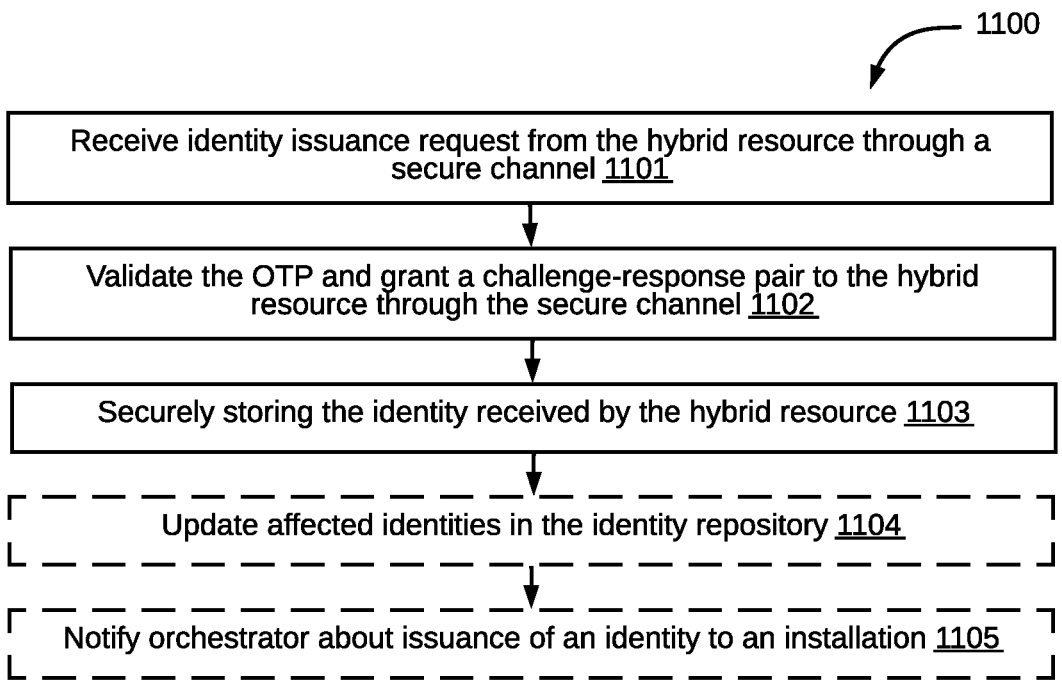
FIG. 11 illustrates a flow diagram of an exemplary process for assigning a unique identity to hybrid resources, in accordance with some embodiments of the present disclosure.

Referring now to FIG. 11, an exemplary process 1100 for assigning a unique identity to hybrid resources is depicted via a flowchart, in accordance with some embodiments of the present disclosure. In an embodiment, the process 1100 may be implemented by the security management system 101. The process 1100 includes receiving an identity issuance request from the hybrid resource through a secure channel, at step 1101. Further, the process 1100 includes validating the OTP and grant a challenge-response pair to the hybrid resource through the secure channel, at step 1102. Further, the process 1100 includes securely storing the identity received by the hybrid resource, at step 1103. Further, the process 1100 includes updating affected identities in the identity repository, at step 1104. Further, the process 1100 includes notifying the orchestrator 302 about issuance of an identity to an installation, at step 1105.

The process 1100 is implemented by the SSA 316 and the identity issuer 322. the SSA 316, with an access to the OTP, establishes a secure communication channel with the identity issuer 322 using existing cryptographic mechanisms such as, Elliptic Curve Diffie Hellman (ECDH). Further, the SSA 316 provides the OTP to the identity issuer 322. The identity issuer 322 validates the OTP and the validity of expiry timestamp. Upon successful validation of the OTP an identity from the reserved set of identities for the installation is supplied to the SSA 316. Once identity is supplied, the identity store 320 updates the information accordingly with respect to each of the dirty, the OTP, the OTP expiry timestamp, and the expiry timestamp. More specifically, changes made to the identity store 320 of the security provider 304 include dirty field of the entity used for identity issuance is turned ON, OTP and OTP expiry timestamp fields of entities related to the installation are set to NULL, and the expiry timestamp of the entity used for identity issuance is set to preconfigured value. The value of preconfigured value may be in a range of hours, days, or months, depending on enterprise requirements. The identity issuer 322 notifies the orchestrator 302 of the issuance of new identity to an installation. Upon receiving the notification, the orchestrator 302 ensures policy enforcement for the installation. In parallel, the SSA 316, upon receiving the unique identity, ensures protection of the unique identity using the identity protector 305.

Figure 12:
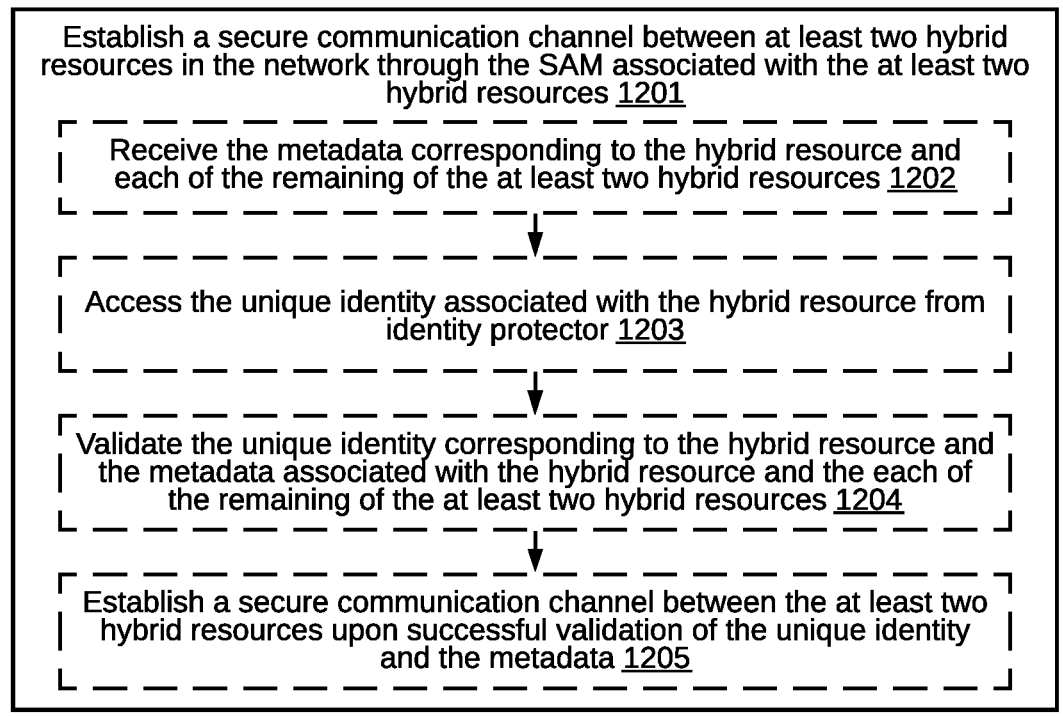
FIG. 12 illustrates a flow diagram of an exemplary process for establishing a secure communication channel between at least two hybrid resources, in accordance with some embodiments of the present disclosure.

Referring now to FIG. 12, an exemplary process 1200 for establishing a secure communication channel between at least two hybrid resources in the network is depicted via a flowchart, in accordance with some embodiments of the present disclosure. In an embodiment, the process 1200 may be implemented by the security management system 101. The process 1200 may include establishing a secure communication channel between at least two hybrid resources (for example, the hybrid resource 404a and the hybrid resource 404b) in the network through the SAM associated with the at least two hybrid resources, at step 1201. The at least two hybrid resources are a part of the plurality of hybrid resources in the network. Further, the step 1201 of the process 1200 may include receiving, by a hybrid resource of the at least two hybrid resources, the metadata corresponding to the hybrid resource and each of remaining of the at least two hybrid resources, at step 1202. Further, the step 1201 of the process 1200 may include receiving, by the hybrid resource, the unique identity associated with the hybrid resource through an identity protector, at step 1203. Further, the step 1201 of the process 1200 may include validating, by the hybrid resource, the unique identity corresponding to the hybrid resource and the metadata associated with the hybrid resource and the each of the remaining of the at least two hybrid resources, at step 1204. Further, the step 1201 of the process 1200 may include establishing, by the hybrid resource, a secure communication channel between the at least two hybrid resources upon successful validation of the unique identity and the metadata, at step 1205.

By way of an example, the SAM service 402 is associated with the hybrid resource segment 401. The hybrid resource segment includes the hybrid resource 404a and the hybrid resource 404b. The SAM service 402 may include the metadata associated with each of the hybrid resource 404a and the hybrid resource 404b. The authenticator 412a of the hybrid resource 404a may receive the unique identity associated with the hybrid resource 404a through the identity protector and the metadata corresponding to the hybrid resource 404a and the hybrid resource 404b through the SAM service 402. Further, the authenticator 412a may validate the metadata and the unique identity of the hybrid resource 404b. Similarly, the authenticator 412b may validate the metadata and the unique identity of the hybrid resource 404a. Upon successful validation of the metadata and the unique identity of the hybrid resource 404a and the hybrid resource 404b, a secure communication channel may be established between the hybrid resource 404a and the hybrid resource 404b through the SAM service 402.

Figure 13:
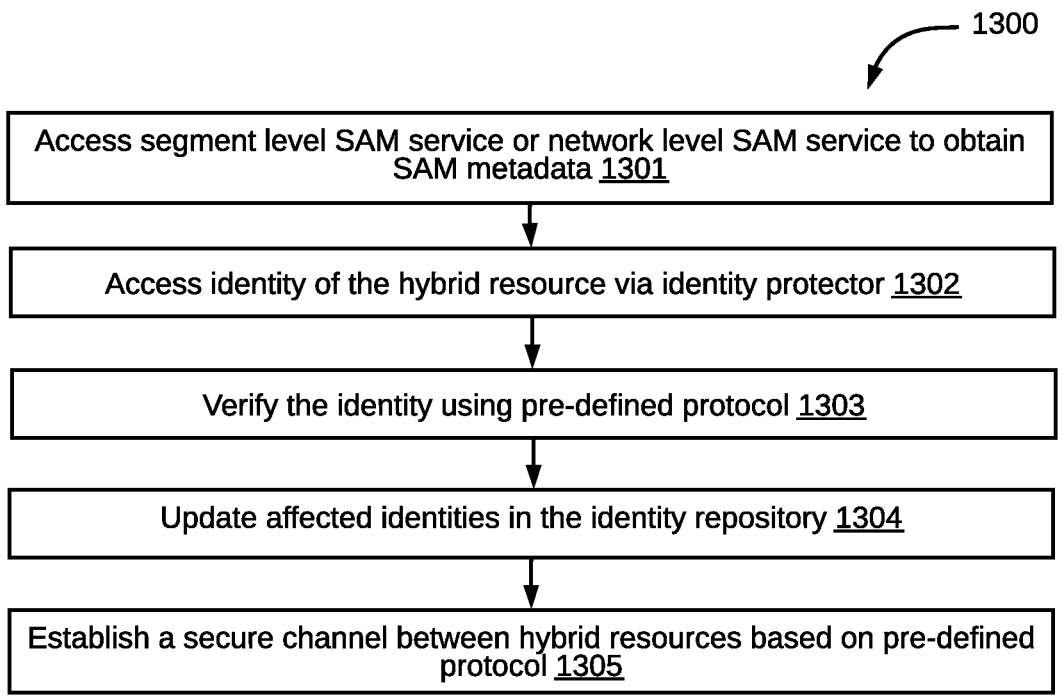
FIG. 13 is a flow diagram of a detailed exemplary process for establishing a secure communication channel between at least two hybrid resources, in accordance with some embodiments of the present disclosure.

Referring now to FIG. 13, a detailed exemplary process 1300 for establishing a secure communication channel between at least two hybrid resources is depicted via a flowchart, in accordance with some embodiments of the present disclosure. In an embodiment, the process 1300 may be implemented by the security management system 101. The process 1300 includes accessing segment level SAM service or network level SAM service to obtain SAM metadata, at step 1301. Further, the process 1300 includes accessing identity of the hybrid resource via identity protector, at step 1302. Further, the process 1300 includes verifying the identity using pre-defined protocol, at step 1303. Further, the process 1300 includes updating affected identities in the identity repository, at step 1304. Further, the process 1300 includes establishing a secure channel between hybrid resources based on pre-defined protocol, at step 1305.

By way of an example, when at least two hybrid resources (such as the hybrid resource 404a with an installation ID "x" and the hybrid resource 404b with an installation ID "y") attempt to communicate via a specific requirement of port, protocol, etc., the at least two hybrid resources 404a and 404b search for suitable entries from the SAM service. Specific implementation of searching algorithm depends on size of network and number of entries in each of the SAM services. In an embodiment, the searching algorithm may use {installation-id, port, protocol, date and time, cross domain} as searching criteria to find a suitable entry. Once a matching entry is identified, security-credential-metadata is accessible to the each of the at least two hybrid resources 404a and 404b. Further, the authentication and validation of the unique identities of the at least two hybrid resources 404a and 404b is performed by the authenticators 412b and 412a, respectively, based on a pre-defined protocol to interpret the security-credential-metadata using the unique identities. The pre-defined protocol implemented in the authenticators 412b and 412a further establishes a secure encrypted channel between the at least two hybrid resources 404a and 404b.

Figure 14:
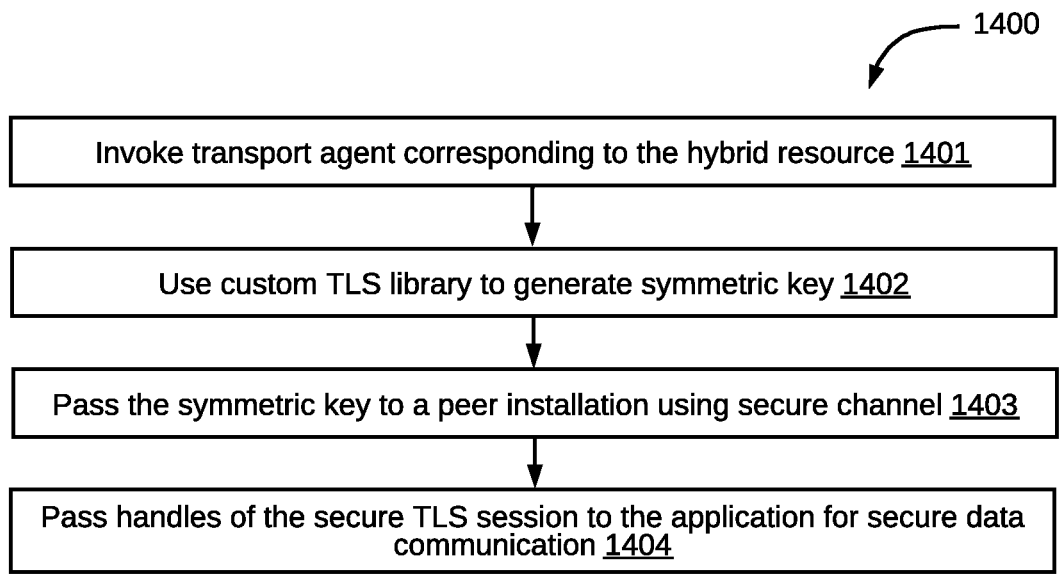
FIG. 14 illustrates a flow diagram of an exemplary process for secure communication between at least two hybrid resources, in accordance with some embodiments of the present disclosure.

Referring now to FIG. 14, an exemplary process 1400 for secure communication between at least two hybrid resources is depicted via a flowchart, in accordance with some embodiments of the present disclosure. In an embodiment, the process 1400 may be implemented by the security management system 101. The process 1400 includes invoking transport agent corresponding to the hybrid resource, at step 1401. Further, the process 1400 includes using a custom TLS library to generate symmetric key, at step 1402. Further, the process 1400 includes passing the symmetric key to a peer installation using secure channel, at step 1403. Further, the process 1400 includes passing handles of the secure TLS session to the application for secure data communication, at step 1404.

The security management system uses custom TLS library as a transport agent (such as the transport agents 411a and 411b). A standard TLS mechanism includes two phases. First phase performs authentication of the peers and exchange of keys. Second phase ensures secure data communication. In an embodiment, the first phase of the TLS is replaced by the authentication and validation, as has been discussed in detail in FIG. 12. Rest of the TLS protocol remains as is to ensure secure data communication.

Figure 15:
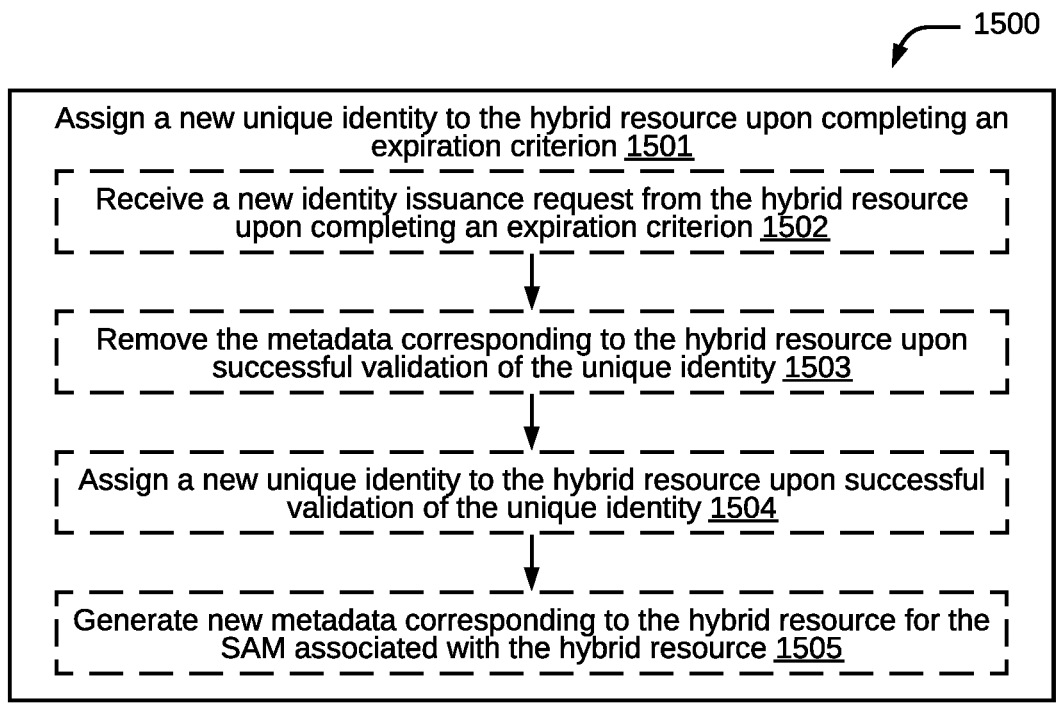
FIG. 15 illustrates a flow diagram of an exemplary process for assigning a new unique identity to the hybrid resource, in accordance with some embodiments of the present disclosure.

Referring now to FIG. 15, an exemplary process 1500 for assigning a new unique identity to the hybrid resource is depicted via a flowchart, in accordance with some embodiments of the present disclosure. In an embodiment, the process 1500 may be implemented by the security management system 101. The process 1500 includes assigning a new unique identity to the hybrid resource upon completing an expiration criterion, at step 1501. The expiration criterion includes one of validation of the expiry timestamp of the unique identity or imminent validation of the expiry timestamp of the unique identity. In some embodiments, the expiration criterion for issuing new unique identity may be need-based (for example, when the system detects new threats or anomalies and requires reinitializing of one or more hybrid resources).

Further, the step 1501 of the process 1500 may include receiving a new identity issuance request from the hybrid resource upon completing an expiration criterion, at step 1502. The new identity issuance request includes the unique identity. Further, the step 1501 of the process 1500 may include removing the metadata corresponding to the hybrid resource upon successful validation of the unique identity, at step 1503. Further, the step 1501 of the process 1500 may include assigning a new unique identity to the hybrid resource upon successful validation of the unique identity, at step 1504. Further, the step 1501 of the process 1500 may include generating, by the security management system, new metadata corresponding to the hybrid resource for the SAM associated with the hybrid resource, at step 1505.

Figure 16:
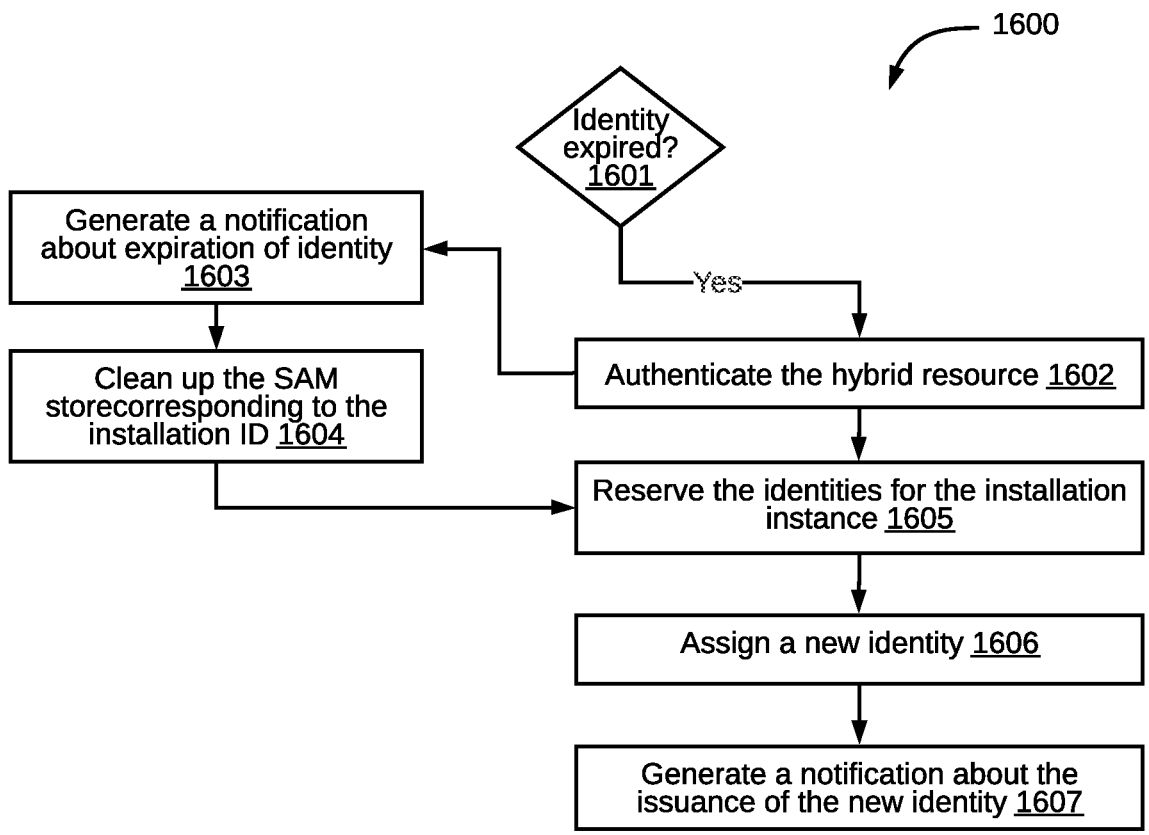
FIG. 16 is a flow diagram of a detailed exemplary control logic for assigning a new unique identity to a hybrid resource, in accordance with some embodiments of the present disclosure.

Referring now to FIG. 16, a detailed exemplary process 1600 for assigning a new unique identity to a hybrid resource is depicted via a flowchart, in accordance with some embodiments of the present disclosure. In an embodiment, the process 1600 may be implemented by the security management system 101. At step 1601 of the process 1600, a check is performed to determine whether an identity is expired. When the identity is determined as an expired identity, the hybrid resource is authenticated at step 1602. Further, the process 1600 includes, upon successful authentication of the hybrid resource, generating a notification for expiration of identity, at step 1603. Further, the process 1600 includes cleaning up the SAM store corresponding to the installation ID, at step 1604. Further, the process 1600 includes, upon successful authentication of the hybrid resource, reserving the identities for the installation instance, at step 1605. Further, the process 1600 includes assigning a new identity, at step 1606. Further, the process 1600 includes generating a notification for the issuance of the new identity, at step 1607.

An expiry timestamp is attached to the identity. The identity is of the form {Challenge, Response, Expiry timestamp}. Further, the identity is assigned to a hybrid resource (such as the hybrid resource 311). Information of the identity is stored in the hybrid resource 311 as well as a record is maintained in the identity store 320 of the security provider 304. It may be noted that the hybrid resource 311 and the identity store 320 may detect an expired identity or imminent expiry of the identity. In an exemplary scenario, the security provider 304 may detect expiry of an identity and notify the orchestrator 302. In such a scenario, upon receiving the notification, the orchestrator 302 may perform required cleanup on each of the SAM services where a policy is enforced for the installation. In another exemplary scenario, the SSA 316 may detect expiry of an identity and initiate a renewal session with the identity issuer 322. In such a scenario, the SSA 316 may self-authenticate with the identity issuer 322 using a current identity. Upon successful validation, the identity issuer 322 may generate a new identity (on demand), distribute the new identity (on demand), and issue the new identity (mandatory), in accordance with the embodiments of the present disclosure. Further, the identity issuer 322 may notify the identity issuance to the orchestrator 302. Further, the identity issuer 322 shares the new identity with the SSA 316 and notifies the orchestrator 302 of the issuance of the new identity. The orchestrator 302 proceeds to perform policy enforcement.

A communication channel between the SSA 316 and the identity issuer 322 is a primitive cryptographic channel using ECDH protocol. Authentication is performed using the current identity. Further, the orchestrator 302 performs a cleanup of the SAM service upon receiving an expiry notification from the security provider 304. When the SSA 316 of the hybrid resource 311 is unable to renew the identity, the system may stop communicating with the hybrid resource 311 and eventually, the orchestrator 302 may detect the hybrid resource 311 through a system monitoring process. Further, the defective hybrid resource 311 may be uninstalled from the system.

Figure 17:
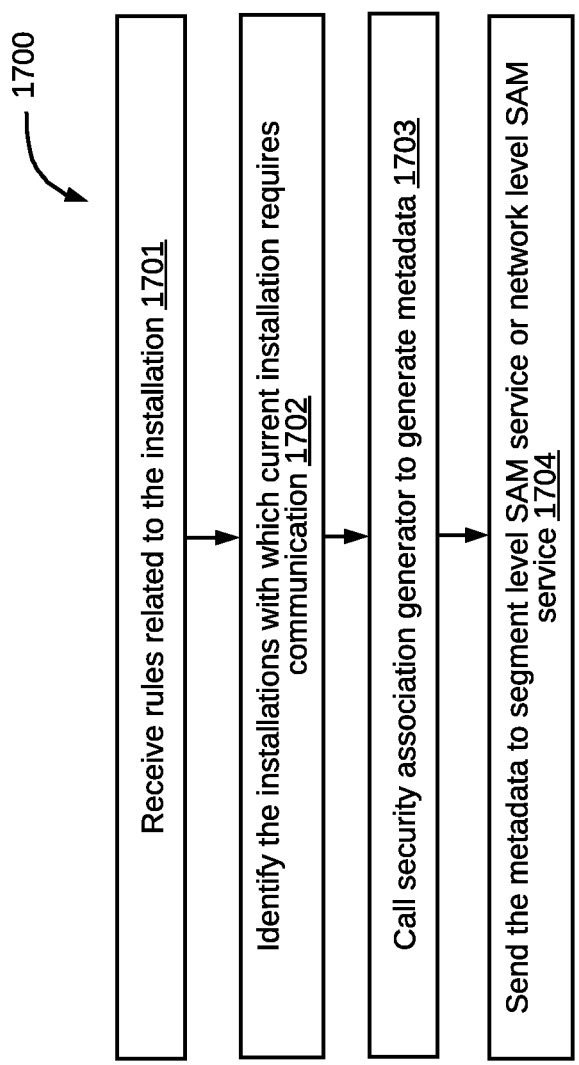
FIG. 17 is a flow diagram of an exemplary process for enforcing enterprise policies, in accordance with some embodiments of the present disclosure.

Referring now to FIG. 17, an exemplary process 1700 for enforcing enterprise policies is depicted via a flowchart, in accordance with some embodiments of the present disclosure. In an embodiment, the process 1700 may be implemented by the security management system 101. The process 1700 includes receiving rules related to the installation, at step 1701. Further, the process 1700 includes identifying the installations with which current installations require communication, at step 1702. Further, the process 1700 includes calling security association generator to generate metadata, at step 1703. Further, the process 1700 includes sending the metadata to segment level SAM service or network level SAM service, at step 1704.

Policy store 309 of the orchestrator 302 includes enterprise rules associated with a hybrid resource. Each of the enterprise rules associated with two hybrid resources between which the enterprise 301 allows communication are received. The policy store 309 uses the security association generator 324 to translate the enterprise rules into metadata and sends the metadata to an appropriate SAM service. Format of data saved into the SAM service is {installation ID "x", installation ID "y", security-credential-metadata}. The security-credential-metadata is defined by a pre-defined protocol and may be interpreted by the hybrid resources represented by installation ID "x" and installation ID "y".

For each of policies, two or more end points are uniquely determined and communication between the two or more end points is allowed by an enterprise rule. Further, a pair of hybrid resources represented by {installation ID "x", installation ID "y"} may communicate with each other provided a security-credential-metadata is generated using a pre-defined protocol. The generation of security-credential-metadata is performed by the security association generator 324.

The security association generator 324 may augment the data {installation ID "x", installation ID "y", security-credential-metadata} with additional details to enable flexibility in defining enterprise rules. The additional details include a port (such as, a communication port), a protocol (such as, communication protocol), time of day (date and time of communication, which may be useful for CRON job), cross domain access rights (if enabled, hybrid resources may communicate when they are in a different network segment). The additional information may be stored into the SAM service in form of {installation-id-x, installation-id-y, security-credential-metadata, port, protocol, date and time, cross domain access right}. Further, locality of security references is ensured. The security association data is essentially placed in the SAM service running at the network segment where installation ID "x" and installation ID "y" are located. The locality of reference may ensure information is located closer to the hybrid resources and thereby a latency to access the resource is reduced.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 18:
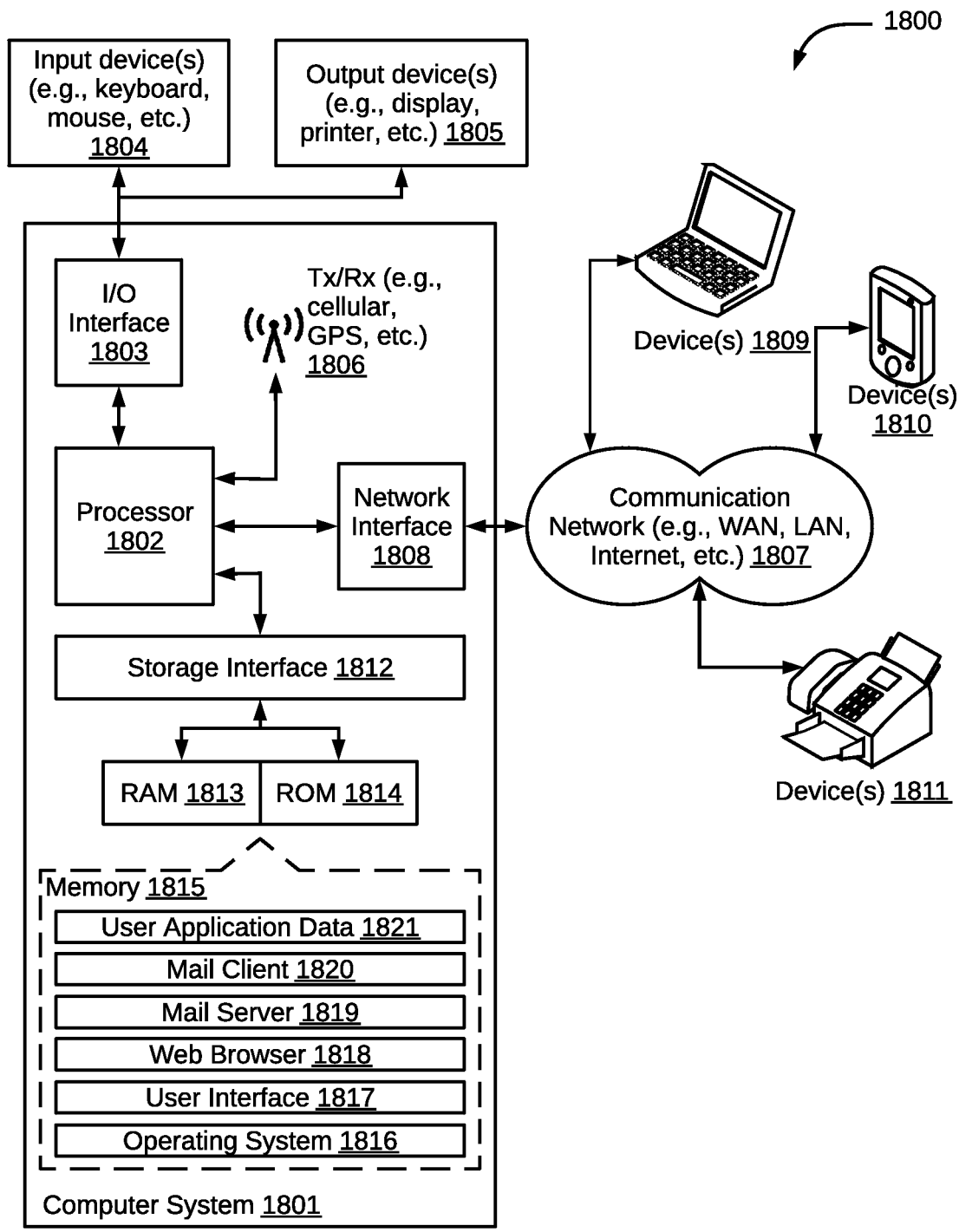
FIG. 18 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 18, a block diagram of an exemplary computer system 1801 for implementing embodiments consistent with the present disclosure is illustrated. Variations of computer system 1801 may be used for implementing system 100 for certificate-less security management of interconnected hybrid resources. Computer system 1801 may include a central processing unit ("CPU" or "processor") 1802. Processor 1802 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1802 may be disposed in communication with one or more input/output (I/O) devices via I/O interface 1803. The I/O interface 1803 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1803, the computer system 1801 may communicate with one or more I/O devices. For example, the input device 1804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1805 may be a printer, fax machine, video display (e.g., cathode ray tube (CRT), liquid crystal display (LCD), light-emitting diode (LED), plasma, or the like), audio speaker, etc. In some embodiments, a transceiver 1806 may be disposed in connection with the processor 1802. The transceiver 1806 may facilitate various types of wireless transmission or reception. For example, the transceiver 1806 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1802 may be disposed in communication with a communication network 1808 via a network interface 1807. The network interface 1807 may communicate with the communication network 1808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1808 may include, without limitation, a direct interconnection, local area network (LAN), wide area network (WAN), wireless network (e.g., using Wireless Application Protocol), the Internet, etc. Using the network interface 1807 and the communication network 1808, the computer system 1801 may communicate with devices 1809, 1810, and 1811. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1801 may itself embody one or more of these devices.

In some embodiments, the processor 1802 may be disposed in communication with one or more memory devices (e.g., RAM 1813, ROM 1814, etc.) via a storage interface 1812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1816, user interface application 1817, web browser 1818, mail server 1819, mail client 1820, user/application data 1821 (e.g., any data variables or data records discussed in this disclosure), etc. The operating system 1816 may facilitate resource management and operation of the computer system 1801. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1817 may facilitate display, execution, interaction, manipulation, or operation of program components through textual or graphical facilities. For example, user interfaces may provide computer interaction interface elements on a display system operatively connected to the computer system 1801, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1801 may implement a web browser 1818 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1801 may implement a mail server 1819 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1801 may implement a mail client 1820 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1801 may store user/application data 1821, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of certificate-less security management of interconnected hybrid resources. The method and system group a set of virtual secret-key-material (crypto keys) into multiple sub-groups, each attached to an individual identity (digital hybrid resource) providing mechanism to assign block of identities to endpoints operating within single-domain or multi-domain deployment model. Trust verification mechanism follows the flat relational structure and is independent of central authority for trust-chain validation. The method and system generate and assign cryptographic digital identity to individual entities (digital hybrid resources), simplifying the manageability and reducing the latency of identity issuance for hybrid infrastructure. Further, the method and system notify expiry of identity, allowing deployed system to implement a low-latency mechanism for identity renewal, revocation, and validation make renewal and expiry process faster with a reduced overhead. The method and system keep security setup information closer to the end points to ensure faster access and high performance to ensure decentralization. End points work independently as long as security setup information is pushed into the network segment local to the hybrid resource. Further, the method and system provide flexibility to implement enterprise rules by integrating digital trust and enterprise policies. Further, the method and system provide a resource initiated identification verification using the assigned identity and adapting to existing standard pre-defined authentication protocols (certificate-less endpoint identity and authentication) to eliminate a dependency on the PKI infrastructure and operational overhead of managing the X.509/Certificates.

As will be appreciated by those skilled in the art, the techniques described in the various embodiments discussed above are not routine, or conventional, or well understood in the art. The techniques discussed above provide for certificate-less security management of interconnected hybrid resources. The techniques first select at least one hybrid resource from a plurality of hybrid resources in a network to install a pre-calculated security configuration. For each of the at least one hybrid resource, the techniques may then receive an OTP valid for a pre-configured time period, in response to an identity generation request for a hybrid resource. The OTP is generated based on an availability of a free identity block corresponding to the hybrid resource in an identity repository. The identity repository stores identities associated with the plurality of hybrid resources in the network. For each of the at least one hybrid resource, the techniques may then install a security data payload including the OTP and the pre-calculated security configuration, in the hybrid resource. For each of the at least one hybrid resource, the techniques may then receive an identity issuance request from the hybrid resource through a secure channel upon installation of the security data payload in the hybrid resource. The identity issuance request includes the OTP. For each of the at least one hybrid resource, the techniques may then assign a unique identity to the hybrid resource upon successful validation of the OTP received in the identity issuance request. The unique identity is securely stored in the identity repository and the hybrid resource. For each of the at least one hybrid resource, the techniques may then generate, upon assignment, metadata corresponding to the hybrid resource for a SAM associated with the hybrid resource, wherein the SAM is associated at a level of one of the hybrid resource or the network.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for certificate-less security management of interconnected hybrid resources. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of certificate-less security management of interconnected hybrid resources, the method comprising:
    selecting, by a security management system, at least one hybrid resource from a plurality of hybrid resources in a network to install a pre-calculated security configuration;
    for each of the at least one hybrid resource, receiving, by the security management system, a One Time Password (OTP) valid for a pre-configured time period, in response to an identity generation request for a hybrid resource, wherein the OTP is generated based on an availability of a free identity block corresponding to the hybrid resource in an identity repository, and wherein the identity repository stores identities associated with the plurality of hybrid resources in the network;
    installing, by the security management system, a security data payload comprising the OTP and the pre-calculated security configuration, in the hybrid resource;
    receiving, by the security management system, an identity issuance request from the hybrid resource through a secure channel upon installation of the security data payload in the hybrid resource, wherein the identity issuance request comprises the OTP;
    assigning, by the security management system, a unique identity to the hybrid resource upon successful validation of the OTP received in the identity issuance request, wherein the unique identity is securely stored in the identity repository and the hybrid resource; and generating, upon assignment and by the security management system, metadata corresponding to the hybrid resource for a Security Association Map (SAM) associated with the hybrid resource, wherein the SAM is associated at a level of one of the hybrid resource or the network.

2. The method of claim 1, further comprising establishing, by the security management system, a secure communication channel between at least two hybrid resources in the network through the SAM associated with the at least two hybrid resources, wherein the at least two hybrid resources are a part of the plurality of hybrid resources in the network.

3. The method of claim 2, wherein the establishing the secure communication channel comprises:

receiving, by a hybrid resource of the at least two hybrid resources, the metadata corresponding to the hybrid resource and each of the remaining of the at least two hybrid resources;

accessing, by the hybrid resource, the unique identity associated with the hybrid resource through an identity protector;

validating, by the hybrid resource, the unique identity associated with the hybrid resource and the metadata corresponding to the hybrid resource and the each of the remaining of the at least two hybrid resources; and establishing, by the hybrid resource, the secure communication channel between the at least two hybrid resources upon successful validation of the unique identity and the metadata.

4. The method of claim 1, further comprising reserving, by the security management system, the free identity block corresponding to the hybrid resource in the identity repository prior to generating the OTP.

5. The method of claim 1, further comprising creating, by the security management system, the security data payload for the hybrid resource, wherein the OTP and the precalculated security configuration is packaged within the security data payload.

6. The method of claim 1, wherein, for the free identity block of the hybrid resource, the identity repository comprises an installation number, the OTP, and an expiry timestamp of the unique identity.

7. The method of claim 6, further comprising determining, by the security management system, the installation number corresponding to each of the at least one hybrid resource.

8. The method of claim 6, further comprising assigning, by the security management system, a new unique identity to the hybrid resource upon completing an expiration criterion or upon a need-based trigger, wherein the expiration criterion comprises one of:

validation of the expiry timestamp of the unique identity; or imminent validation of the expiry timestamp of the unique identity.

9. The method of claim 8, wherein assigning the new unique identity to the hybrid resource comprises:

receiving, by the security management system, a new identity issuance request from the hybrid resource upon completing an expiration criterion, wherein the new identity issuance request comprises the unique identity;

removing, by the security management system, the metadata corresponding to the hybrid resource upon successful validation of the unique identity; assigning, by the security management system, a new unique identity to the hybrid resource upon successful validation of the unique identity; and generating, by the security management system, new metadata corresponding to the hybrid resource for the SAM associated with the hybrid resource.

10. A system for certificate-less security management of interconnected hybrid resources, the system comprising:

one or more orchestrators configured to:

select at least one hybrid resource from a plurality of hybrid resources in a network to install a pre-calculated security configuration;

for each of the at least one hybrid resource, receive a One Time Password (OTP) valid for a pre-configured time period, in response to an identity generation request for a hybrid resource, wherein the OTP is generated based on an availability of a free identity block corresponding to the hybrid resource in an identity repository, and wherein the identity repository stores identities associated with the plurality of hybrid resources in the network; and install a security data payload comprising the OTP and the pre-calculated security configuration, in the hybrid resource; and a security provider configured to:

for each of the at least one hybrid resource, receive an identity issuance request from the hybrid resource through a secure channel upon installation of the security data payload in the hybrid resource, wherein the identity issuance request comprises the OTP;

assign a unique identity to the hybrid resource upon successful validation of the OTP received in the identity issuance request, wherein the unique identity is securely stored in the identity repository and the hybrid resource; and generate, upon assignment, metadata corresponding to the hybrid resource for a Security Association Map (SAM) associated with the hybrid resource, wherein the SAM is associated at a level of one of the hybrid resource or the network.

11. The system of claim 10, wherein the hybrid resource is further configured to establish a secure communication channel between at least one hybrid resource in the network through the SAM associated with the at least one hybrid resource, wherein the hybrid resource and the at least one hybrid resource are a part of the plurality of hybrid resources in the network.

12. The system of claim 11, wherein, to establish the secure communication channel, the hybrid resource is further configured to:

receive the metadata corresponding to the hybrid resource and each of the at least one hybrid resource;

access the unique identity associated with the hybrid resource through an identity protector;

validate the unique identity associated with and the metadata corresponding to the hybrid resource and each of the at least one hybrid resource; and establish the secure communication channel between the hybrid resource and the at least one hybrid resource upon successful validation of the unique identity and the metadata.

13. The system of claim 10, wherein the security provider is further configured to reserve the free identity block corresponding to the hybrid resource in the identity repository prior to generating the OTP.

14. The system of claim 10, wherein the one or more orchestrators are further configured to create the security data payload for the hybrid resource, wherein the OTP and the precalculated security configuration is packaged within the security data payload.

15. The system of claim 10, wherein, for the free identity block of the hybrid resource, the identity repository comprises an installation number, the OTP, and an expiry timestamp of the unique identity.

16. The system of claim 15, wherein the one or more orchestrators are further configured to determine the installation number corresponding to each of the at least one hybrid resource.

17. The system of claim 15, wherein the security provider is further configured to assign a new unique identity to the hybrid resource upon completing an expiration criterion or upon a need-based trigger, wherein the expiration criterion comprises one of:
  validation of the expiry timestamp of the unique identity; or
  imminent validation of the expiry timestamp of the unique identity.

18. The system of claim 17, wherein, to assign the new unique identity to the hybrid resource, the security provider is further configured to:
  receive a new identity issuance request from the hybrid resource upon completing an expiration criterion, wherein the new identity issuance request comprises the unique identity;
  remove the metadata corresponding to the hybrid resource upon successful validation of the unique identity;
  assign a new unique identity to the hybrid resource upon successful validation of the unique identity; and
  generate new metadata corresponding to the hybrid resource for the SAM associated with the hybrid resource.

19. A non-transitory computer-readable medium storing computer-executable instructions for certificate-less security management of interconnected hybrid resources, the computer-executable instructions configured for:
  selecting at least one hybrid resource from a plurality of hybrid resources in a network to install a pre-calculated security configuration; and
  for each of the at least one hybrid resource, receiving a One Time Password (OTP) valid for a pre-configured time period, in response to an identity generation request for a hybrid resource, wherein the OTP is generated based on an availability of a free identity block corresponding to the hybrid resource in an identity repository, and wherein the identity repository stores identities associated with the plurality of hybrid resources in the network;
  installing a security data payload comprising the OTP and the pre-calculated security configuration, in the hybrid resource;
  receiving an identity issuance request from the hybrid resource through a secure channel upon installation of the security data payload in the hybrid resource, wherein the identity issuance request comprises the OTP;
  assigning a unique identity to the hybrid resource upon successful validation of the OTP received in the identity issuance request, wherein the unique identity is securely stored in the identity repository and the hybrid resource; and
  generating, upon assignment, metadata corresponding to the hybrid resource for a Security Association Map (SAM) associated with the hybrid resource, wherein the SAM is associated at a level of one of the hybrid resource or the network.

20. The non-transitory computer-readable medium of claim 19, wherein the computer executable instructions are further configured for establishing a secure communication channel between at least two hybrid resources in the network through the SAM associated with the at least two hybrid resources, wherein the at least two hybrid resources are a part of the plurality of hybrid resources in the network.

* * * * *